(12) United States Patent
Collier

(10) Patent No.: US 10,539,747 B2
(45) Date of Patent: Jan. 21, 2020

(54) BEND INDUCED LIGHT SCATTERING FIBER AND CABLE ASSEMBLIES AND METHOD OF MAKING

(71) Applicant: CORNING RESEARCH & DEVELOPMENT CORPORATION, Corning, NY (US)

(72) Inventor: Adam Kent Collier, Montour Falls, NY (US)

(73) Assignee: Corning Research & Development Corporation, Charlotte, NC (US)

(*) Notice: Subject to any disclaimer, the term of this patent is extended or adjusted under 35 U.S.C. 154(b) by 0 days.

(21) Appl. No.: 16/144,094

(22) Filed: Sep. 27, 2018

(65) Prior Publication Data

US 2019/0170949 A1 Jun. 6, 2019

Related U.S. Application Data

(60) Provisional application No. 62/594,798, filed on Dec. 5, 2017.

(51) Int. Cl.
*G02B 6/38* (2006.01)
(52) U.S. Cl.
CPC ......... *G02B 6/3879* (2013.01); *G02B 6/3887* (2013.01); *G02B 6/3893* (2013.01)
(58) Field of Classification Search
None
See application file for complete search history.

(56) References Cited

U.S. PATENT DOCUMENTS

| 3,942,859 A | 3/1976 | Korodi |
| 4,412,936 A | 11/1983 | Khmelkov et al. |
| 4,422,719 A * | 12/1983 | Orcutt ............... B29D 11/00711 385/123 |

(Continued)

FOREIGN PATENT DOCUMENTS

| CN | 200941319 Y | 8/2007 |
| CN | 201419706 Y | 3/2010 |

(Continued)

OTHER PUBLICATIONS

Jeff Hecht, Understanding Fiber Optics, 4th Edition, 2002, pp. 106-107.*

(Continued)

*Primary Examiner* — Tina M Wong
(74) *Attorney, Agent, or Firm* — Adam R. Weeks

(57) ABSTRACT

Embodiments of the disclosure are directed to a bend induced light scattering (BIS) optical fiber and method of making. The BIS optical fiber includes a core of pure silica devoid of nanovoids and a cladding surrounding the core. The core has a first index of refraction and the cladding has a second index of refraction that is lower than the first index of refraction of the core. The first index of refraction of the core and the second index of refraction of the cladding are configured to maintain light within the core when the BIS optical fiber is unbent in a light retaining position and to emit light from the core to the cladding at a bend in the BIS optical fiber when the radius of curvature of the bend is less than a critical radius of curvature and the BIS optical fiber is in a light emitting position.

22 Claims, 15 Drawing Sheets

(56) References Cited

U.S. PATENT DOCUMENTS

| | | | |
|---|---|---|---|
| 4,466,697 A * | 8/1984 | Daniel | A47G 19/16 385/123 |
| 4,557,552 A | 12/1985 | Newton et al. | |
| 4,637,686 A | 1/1987 | Iwamoto et al. | |
| 4,755,018 A | 7/1988 | Heng et al. | |
| 4,762,416 A * | 8/1988 | Lefevre | G01C 19/721 356/460 |
| 4,763,984 A | 8/1988 | Awai et al. | |
| 4,768,854 A * | 9/1988 | Campbell | G02B 5/26 250/227.11 |
| 4,923,274 A | 5/1990 | Dean | |
| 4,995,691 A | 2/1991 | Purcell, Jr. | |
| 5,006,806 A | 4/1991 | Rippingale et al. | |
| 5,017,873 A | 5/1991 | Rippingale et al. | |
| 5,040,867 A | 8/1991 | de Jong et al. | |
| 5,122,750 A | 6/1992 | Rippingale et al. | |
| 5,179,611 A | 1/1993 | Umeda et al. | |
| 5,206,065 A | 4/1993 | Rippingale et al. | |
| 5,305,405 A | 4/1994 | Emmons et al. | |
| 5,329,348 A | 7/1994 | Nimura et al. | |
| 5,333,228 A | 7/1994 | Kingstone | |
| 5,377,292 A | 12/1994 | Bartling et al. | |
| 5,394,496 A | 2/1995 | Caldwell et al. | |
| 5,395,362 A | 3/1995 | Sacharoff et al. | |
| 5,432,876 A | 7/1995 | Appledorn et al. | |
| 5,463,706 A | 10/1995 | Dumont et al. | |
| 5,500,913 A | 3/1996 | Allen et al. | |
| 5,591,160 A | 1/1997 | Reynard | |
| 5,666,453 A | 9/1997 | Dannenmann | |
| 5,741,152 A | 4/1998 | Boutros | |
| 5,764,043 A | 6/1998 | Czosnowski et al. | |
| 5,835,654 A | 11/1998 | Bergmann | |
| 5,937,127 A * | 8/1999 | Zarian | B29D 11/00663 385/128 |
| 5,979,188 A | 11/1999 | Ojha | |
| 5,982,967 A | 11/1999 | Mathis et al. | |
| 6,126,325 A | 10/2000 | Yamane et al. | |
| 6,137,928 A | 10/2000 | Albrecht | |
| 6,137,935 A | 10/2000 | Bohme et al. | |
| 6,159,037 A | 12/2000 | Madsen et al. | |
| 6,173,097 B1 | 1/2001 | Throckmorton et al. | |
| 6,257,750 B1 | 7/2001 | Strasser et al. | |
| 6,278,827 B1 | 8/2001 | Sugiyama et al. | |
| 6,293,081 B1 | 9/2001 | Grulick et al. | |
| 6,301,418 B1 | 10/2001 | Freier et al. | |
| 6,311,000 B1 | 10/2001 | Schneider | |
| 6,314,713 B1 | 11/2001 | Fitz et al. | |
| 6,317,553 B1 | 11/2001 | Harper, Jr. et al. | |
| 6,347,172 B1 | 2/2002 | Keller et al. | |
| 6,356,690 B1 | 3/2002 | McAlpine et al. | |
| 6,379,054 B2 | 4/2002 | Throckmorton et al. | |
| 6,388,194 B1 | 5/2002 | Ryeczek | |
| 6,403,947 B1 | 6/2002 | Hoyt et al. | |
| 6,425,694 B1 | 7/2002 | Szilagyi et al. | |
| 6,439,780 B1 | 8/2002 | Mudd et al. | |
| 6,456,768 B1 | 9/2002 | Boncek et al. | |
| 6,456,785 B1 | 9/2002 | Evans | |
| 6,471,412 B1 | 10/2002 | Belenkiy et al. | |
| 6,519,396 B2 | 2/2003 | Schneider et al. | |
| 6,526,200 B1 | 2/2003 | Davie | |
| 6,532,328 B1 | 3/2003 | Kline | |
| 6,554,485 B1 | 4/2003 | Beatty et al. | |
| 6,560,390 B2 | 5/2003 | Grulick et al. | |
| 6,577,243 B1 | 6/2003 | Dannenmann et al. | |
| 6,596,943 B1 | 7/2003 | Ward | |
| 6,606,431 B2 | 8/2003 | Unsworth | |
| 6,640,028 B1 * | 10/2003 | Schroll | G02B 6/2852 385/32 |
| 6,643,443 B2 | 11/2003 | Holman et al. | |
| 6,678,449 B2 | 1/2004 | Thompson et al. | |
| 6,695,491 B1 | 2/2004 | Leeman et al. | |
| 6,710,254 B2 | 3/2004 | Yueh | |
| 6,712,524 B2 | 3/2004 | Beatty et al. | |
| 6,728,453 B2 | 4/2004 | Petryszak | |
| 6,758,600 B2 | 7/2004 | Del Grosso et al. | |
| 6,798,956 B2 | 9/2004 | Morrison | |
| 6,816,661 B1 | 11/2004 | Barnes et al. | |
| 6,823,120 B2 | 11/2004 | Hurley et al. | |
| 6,829,651 B1 | 12/2004 | Bass et al. | |
| 6,876,809 B1 | 4/2005 | Sonderegger et al. | |
| 6,906,505 B2 | 6/2005 | Brunet et al. | |
| 6,933,438 B1 | 8/2005 | Watts et al. | |
| 6,969,273 B2 | 11/2005 | Chen | |
| 6,979,223 B2 | 12/2005 | Chen | |
| 6,995,565 B1 | 2/2006 | Tulloch et al. | |
| 7,020,369 B2 | 3/2006 | Lodge, Jr. et al. | |
| 7,029,137 B2 | 4/2006 | Lionetti et al. | |
| 7,038,135 B1 | 5/2006 | Chan et al. | |
| 7,049,937 B1 | 5/2006 | Zweig et al. | |
| 7,090,411 B2 | 8/2006 | Brown | |
| 7,121,707 B2 | 10/2006 | Currie et al. | |
| 7,147,383 B2 | 12/2006 | Sullivan | |
| 7,164,819 B2 | 1/2007 | Jenson et al. | |
| 7,215,860 B2 * | 5/2007 | Engelberth | G02B 6/02 385/127 |
| 7,217,152 B1 | 5/2007 | Xin et al. | |
| 7,221,284 B2 | 5/2007 | Scherer et al. | |
| 7,242,831 B2 | 7/2007 | Fee | |
| 7,313,304 B2 | 12/2007 | Andrews et al. | |
| 7,330,632 B1 * | 2/2008 | Buelow, II | A47F 3/001 362/551 |
| 7,401,961 B2 | 7/2008 | Longatti et al. | |
| 7,406,231 B1 | 7/2008 | Beck et al. | |
| 7,433,565 B2 | 10/2008 | Joseph et al. | |
| 7,524,082 B2 | 4/2009 | North | |
| 7,544,909 B2 | 6/2009 | Dhir | |
| 7,572,066 B2 | 8/2009 | De Jong et al. | |
| 7,596,293 B2 | 9/2009 | Isenhour et al. | |
| 7,603,020 B1 | 10/2009 | Wakileh et al. | |
| 7,618,175 B1 | 11/2009 | Hulse | |
| 7,620,279 B2 | 11/2009 | Joseph | |
| 7,653,277 B2 | 1/2010 | Andrews et al. | |
| 7,671,279 B2 | 3/2010 | Yin | |
| 7,748,860 B2 | 7/2010 | Brunet | |
| 7,817,884 B2 | 10/2010 | Demeritt et al. | |
| 7,920,764 B2 | 4/2011 | Kewitsch | |
| 7,932,805 B2 | 4/2011 | Darr et al. | |
| 7,948,226 B2 | 5/2011 | Rathbun, II et al. | |
| 8,000,576 B2 | 8/2011 | Chen et al. | |
| 8,102,169 B2 | 1/2012 | Law et al. | |
| 8,150,227 B2 | 4/2012 | Kewitsch | |
| 8,152,385 B2 | 4/2012 | De Jong et al. | |
| 8,167,471 B1 | 5/2012 | Moritz | |
| 8,314,603 B2 | 11/2012 | Russell | |
| 8,322,871 B1 | 12/2012 | Knaggs et al. | |
| 8,331,752 B2 | 12/2012 | Birilduze et al. | |
| 8,351,750 B2 * | 1/2013 | Fine | B82Y 5/00 385/129 |
| 8,408,029 B2 | 4/2013 | De Angelis et al. | |
| 8,414,319 B2 | 4/2013 | Patel et al. | |
| 8,428,405 B2 | 4/2013 | Kewitsch | |
| 8,492,448 B2 | 7/2013 | Dewa et al. | |
| 8,509,579 B2 | 8/2013 | Martin-Lopez | |
| 8,545,076 B2 | 10/2013 | Bickham et al. | |
| 8,548,293 B2 | 10/2013 | Kachmar | |
| 8,582,939 B2 | 11/2013 | Gimblet et al. | |
| 8,582,940 B2 | 11/2013 | Abernathy et al. | |
| 8,591,087 B2 | 11/2013 | Bickham et al. | |
| 8,620,123 B2 | 12/2013 | Dean, Jr. et al. | |
| 8,620,125 B2 | 12/2013 | Button et al. | |
| 8,662,760 B2 | 3/2014 | Cline et al. | |
| 8,683,827 B2 | 4/2014 | De Angelis et al. | |
| 8,708,724 B2 | 4/2014 | Patel et al. | |
| 8,724,842 B2 | 5/2014 | Sumitani et al. | |
| 8,724,942 B2 | 5/2014 | Logunov et al. | |
| 8,770,525 B2 | 7/2014 | Donaldson et al. | |
| 8,787,717 B2 | 7/2014 | Logunov | |
| 8,791,829 B2 | 7/2014 | Gustafsson et al. | |
| 8,798,419 B2 | 8/2014 | Wessels, Jr. et al. | |
| 8,805,141 B2 | 8/2014 | Fewkes et al. | |
| 8,896,286 B2 | 11/2014 | Abuelsaad et al. | |
| 8,896,287 B2 | 11/2014 | Abuelsaad et al. | |
| 8,897,612 B2 | 11/2014 | Logunov | |

(56) References Cited

U.S. PATENT DOCUMENTS

| | | | |
|---|---|---|---|
| 8,903,212 B2 | 12/2014 | Kachmar |
| 8,909,013 B1 | 12/2014 | Jiang et al. |
| 8,929,703 B2 | 1/2015 | Logunov et al. |
| 9,025,923 B2 | 5/2015 | Logunov et al. |
| 9,073,243 B2 | 7/2015 | Gimblet et al. |
| 9,146,347 B2 | 9/2015 | Logunov et al. |
| 9,182,561 B2 | 11/2015 | Bauco et al. |
| 9,196,975 B2 | 11/2015 | Scherer et al. |
| 9,271,709 B2 | 3/2016 | Grey et al. |
| 9,304,278 B1 | 4/2016 | Bauco et al. |
| 9,388,975 B2 | 7/2016 | Wenger |
| 9,429,731 B2 | 8/2016 | Bookbinder et al. |
| 9,435,713 B2 | 9/2016 | Collier et al. |
| 9,448,380 B2 | 9/2016 | Mogensen |
| 9,507,096 B2 | 11/2016 | Isenhour et al. |
| 9,529,167 B2 | 12/2016 | Wu |
| 9,571,694 B2 | 2/2017 | Hirao |
| 9,671,551 B2 | 6/2017 | Dean, Jr. et al. |
| 9,709,750 B1 | 7/2017 | Kuang et al. |
| 10,120,138 B2* | 11/2018 | Jones .................. G02B 6/3825 |
| 10,234,614 B2* | 3/2019 | Bauco .................. G02B 6/0006 |
| 2001/0002220 A1 | 5/2001 | Throckmorton et al. |
| 2001/0048797 A1 | 12/2001 | Van Dijk et al. |
| 2002/0009282 A1 | 1/2002 | Grulick et al. |
| 2002/0036775 A1 | 3/2002 | Wolleschensky et al. |
| 2002/0037133 A1 | 3/2002 | Unsworth |
| 2002/0136497 A1 | 9/2002 | McGarry et al. |
| 2002/0159735 A1 | 10/2002 | Edvold et al. |
| 2002/0185299 A1 | 12/2002 | Giebel |
| 2003/0002830 A1 | 1/2003 | Petryszak |
| 2003/0016924 A1 | 1/2003 | Thompson et al. |
| 2003/0108270 A1 | 6/2003 | Brimacombe et al. |
| 2003/0108303 A1* | 6/2003 | Asada .................. G02B 6/3887 385/86 |
| 2003/0152344 A1 | 8/2003 | Brunet et al. |
| 2003/0206519 A1 | 11/2003 | Sanders et al. |
| 2003/0222786 A1 | 12/2003 | Dannenmann et al. |
| 2004/0022504 A1 | 2/2004 | Hurley et al. |
| 2004/0052473 A1 | 3/2004 | Seo et al. |
| 2004/0101230 A1* | 5/2004 | Philebrown .......... G02B 6/2937 385/15 |
| 2004/0146254 A1 | 7/2004 | Morrison |
| 2004/0160774 A1 | 8/2004 | Lionetti et al. |
| 2004/0179777 A1 | 9/2004 | Buelow, II et al. |
| 2004/0196648 A1 | 10/2004 | Franklin et al. |
| 2005/0052174 A1 | 3/2005 | Angelo et al. |
| 2005/0089284 A1 | 4/2005 | Ma |
| 2005/0212503 A1 | 9/2005 | Deibele |
| 2005/0271338 A1 | 12/2005 | Livingston |
| 2006/0104578 A1 | 5/2006 | Herbst |
| 2006/0133750 A1 | 6/2006 | Lee |
| 2006/0140562 A1* | 6/2006 | Joseph ................ G02B 6/001 385/124 |
| 2006/0193575 A1 | 8/2006 | Greenwood et al. |
| 2006/0232385 A1 | 10/2006 | Scherer et al. |
| 2006/0285350 A1 | 12/2006 | Wang |
| 2007/0116402 A1 | 5/2007 | Slade et al. |
| 2007/0153508 A1 | 7/2007 | Nall et al. |
| 2007/0217749 A1 | 9/2007 | Jong et al. |
| 2008/0080820 A1 | 4/2008 | Andrews et al. |
| 2008/0087082 A1 | 4/2008 | Andrews et al. |
| 2008/0121171 A1 | 5/2008 | Hulsey |
| 2008/0198618 A1 | 8/2008 | North |
| 2008/0204235 A1 | 8/2008 | Cook |
| 2008/0219621 A1* | 9/2008 | Aldeghi ............... G02B 6/2852 385/32 |
| 2008/0273844 A1 | 11/2008 | Kewitsch |
| 2009/0027873 A1 | 1/2009 | Tarlton |
| 2009/0297104 A1 | 12/2009 | Kachmar |
| 2009/0299440 A9 | 12/2009 | Slatkine |
| 2010/0021114 A1 | 1/2010 | Chen et al. |
| 2010/0066254 A1 | 3/2010 | Ott et al. |
| 2010/0148747 A1 | 6/2010 | Rathbun, II et al. |
| 2010/0166374 A1 | 7/2010 | Lapp |
| 2010/0274235 A1 | 10/2010 | Mihajlovic et al. |
| 2010/0329604 A1* | 12/2010 | Kojima ................ G02B 6/2852 385/31 |
| 2011/0034068 A1 | 2/2011 | Russell |
| 2011/0085776 A1 | 4/2011 | Biribuze et al. |
| 2011/0103747 A1 | 5/2011 | Chang et al. |
| 2011/0103757 A1 | 5/2011 | Alkemper et al. |
| 2011/0122646 A1 | 5/2011 | Bickham et al. |
| 2011/0150488 A1 | 6/2011 | Kewitsch |
| 2011/0305035 A1 | 12/2011 | Bickham et al. |
| 2012/0019900 A1 | 1/2012 | Kitson et al. |
| 2012/0219259 A1 | 8/2012 | Kewitsch |
| 2012/0275178 A1* | 11/2012 | Logunov ............. F21V 13/02 362/552 |
| 2012/0275180 A1 | 11/2012 | Button et al. |
| 2012/0275745 A1 | 11/2012 | Logunov |
| 2012/0308183 A1 | 12/2012 | Irwin et al. |
| 2013/0021597 A1 | 1/2013 | Carlson, Jr. et al. |
| 2013/0088888 A1 | 4/2013 | Fewkes et al. |
| 2013/0107565 A1 | 5/2013 | Genier |
| 2013/0201001 A1 | 8/2013 | Ratnakar |
| 2013/0209037 A1* | 8/2013 | Cooke .................. G02B 6/4465 385/59 |
| 2013/0209045 A1 | 8/2013 | Dean, Jr. et al. |
| 2013/0272014 A1 | 10/2013 | Logunov et al. |
| 2013/0341922 A1 | 12/2013 | Jimenez Buendia |
| 2014/0016904 A1 | 1/2014 | Kachmar |
| 2014/0070639 A1 | 3/2014 | Tamura |
| 2014/0221763 A1 | 8/2014 | Vayser et al. |
| 2014/0227438 A1 | 8/2014 | Dean, Jr. et al. |
| 2014/0270639 A1 | 9/2014 | James, III et al. |
| 2014/0355295 A1 | 12/2014 | Kuchinsky et al. |
| 2014/0363134 A1 | 12/2014 | Bookbinder et al. |
| 2015/0043875 A1 | 2/2015 | Bookbinder et al. |
| 2015/0049992 A1 | 2/2015 | Bauco |
| 2015/0214746 A1 | 7/2015 | Lopez Gomez et al. |
| 2015/0277059 A1 | 10/2015 | Raven et al. |
| 2015/0369986 A1 | 12/2015 | Logunov et al. |
| 2016/0116660 A1* | 4/2016 | Benjamin ........... G02B 6/02395 362/553 |
| 2016/0139353 A1 | 5/2016 | Bauco et al. |
| 2016/0202418 A1 | 7/2016 | Fortin et al. |
| 2016/0231521 A1 | 8/2016 | Smith et al. |
| 2016/0291277 A1 | 10/2016 | Bauco et al. |
| 2016/0313483 A1 | 10/2016 | Chomycz |
| 2016/0313513 A1 | 10/2016 | Wijbrans et al. |
| 2016/0341922 A1 | 11/2016 | Bauco et al. |
| 2016/0377818 A1 | 12/2016 | Tong et al. |
| 2017/0123167 A1 | 5/2017 | Isenhour et al. |
| 2017/0176691 A1 | 6/2017 | Childers et al. |
| 2017/0205587 A1 | 7/2017 | Chang et al. |
| 2017/0207585 A1 | 7/2017 | Butler et al. |
| 2017/0293102 A1* | 10/2017 | Bauco .................. G02B 6/3893 |
| 2017/0315318 A1 | 11/2017 | Modavis |
| 2018/0128996 A1 | 5/2018 | Sawicki et al. |
| 2018/0136398 A1 | 5/2018 | Bauco et al. |
| 2018/0136399 A1 | 5/2018 | Bauco et al. |
| 2018/0172925 A1* | 6/2018 | Bauco .................. G02B 6/3873 |
| 2019/0064447 A1 | 2/2019 | Chang et al. |
| 2019/0170949 A1* | 6/2019 | Collier ................ G02B 6/3879 |

FOREIGN PATENT DOCUMENTS

| | | |
|---|---|---|
| CN | 102589728 A | 7/2012 |
| CN | 201305952 U | 7/2012 |
| CN | 203241575 U | 10/2013 |
| DE | 4413597 A1 | 10/1995 |
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 59182404 A | 4/1983 |
| JP | 61139221 A | 6/1986 |
| JP | 61161827 U | 10/1986 |

(56) References Cited

FOREIGN PATENT DOCUMENTS

| | | | |
|---|---|---|---|
| JP | 02055506 | A | 2/1990 |
| JP | 2108007 | A | 4/1990 |
| JP | 2108008 | A | 4/1990 |
| JP | 6017157 | U | 3/1994 |
| JP | 06130253 | A | 5/1994 |
| JP | 9178956 | A | 7/1997 |
| JP | 9237524 | A | 9/1997 |
| JP | 2008153030 | A | 7/2008 |
| JP | 2009244288 | A | 10/2009 |
| JP | 2010237233 | A | 10/2010 |
| JP | 2013196960 | A | 9/2013 |
| KR | 875507 | B1 | 12/2008 |
| WO | 1998034144 | A1 | 8/1998 |
| WO | 1999024856 | A1 | 5/1999 |
| WO | 2005106899 | A1 | 11/2005 |
| WO | 2006044177 | A2 | 4/2006 |
| WO | 2006113114 | A2 | 10/2006 |
| WO | 2007053371 | A1 | 5/2007 |
| WO | 2008048955 | A2 | 4/2008 |
| WO | 2010011299 | A2 | 1/2010 |
| WO | 2010021896 | A1 | 2/2010 |
| WO | 2011063214 | A | 5/2011 |
| WO | 2013055842 | A1 | 4/2013 |
| WO | 2013059811 | A1 | 4/2013 |
| WO | 2014026300 | A1 | 2/2014 |
| WO | 2015000194 | A1 | 1/2015 |
| WO | 2016170172 | A1 | 10/2016 |

OTHER PUBLICATIONS http://www.dexim.net/list.php?id=7, Dexim product reference, downloaded from the web Feb. 24, 2016. 2 pages.

Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.

Fiber Optic Products, Inc., "Specifications of our Fiber and Cable," n.d. Retrieved on Aug. 9, 2013, 2 pages.

M. Rajesh, "Polymer Photonics: An Overview," Fabrication and Characterisation, 2011, 38 pages.

Schott, "SpectraStream Glass Harnesses," Rev. Nov. 2006, 2 pages.

Spigulis, J., "Side-Emitting Fibers Brighten Our World in New Ways," Oct. 2005, Retrieved from www.osa-opn.org, 6 pages.

"Super Vision Fiber Optics Side Glow Cables," TriN01ihLighting.com, Tri North Lighting, Inc., n.d., Web. Aug. 1, 2013.

"Diode Lasers, Fiber Optics, IR, Red, Green, Blue Diode Lasers, Laser Diode, Fiber Illuminators, Fiber Optics, Coupler, Galvonarneters, Laser Show Acessories," Jan. 1, 2013, httn://www.rneshtel.com/, 1 oage.

Lu et al. Optical fiber with nanostructured cladding ofTi02 nanoparticles self-assembled onto a side polished fiber and its temperature sensing, Optics Express, vol. 22, No. 26, Dec. 29, 2014, 7 pages, downloaded from internet on Jan. 5, 2015.

"Side Emitting Super Glowing Fiber." MeshTel.com. MeshTel-Intelite, Inc., 1996-2012. Web. Aug. 1, 2013.

Endruweit et al. "Spectroscopic experiments regarding the efficiency of side emission optical fibres in the UV-A and visible blue spectrum", Optics and Lasers Engineering 46 (2008) pp. 97-105.

\* cited by examiner

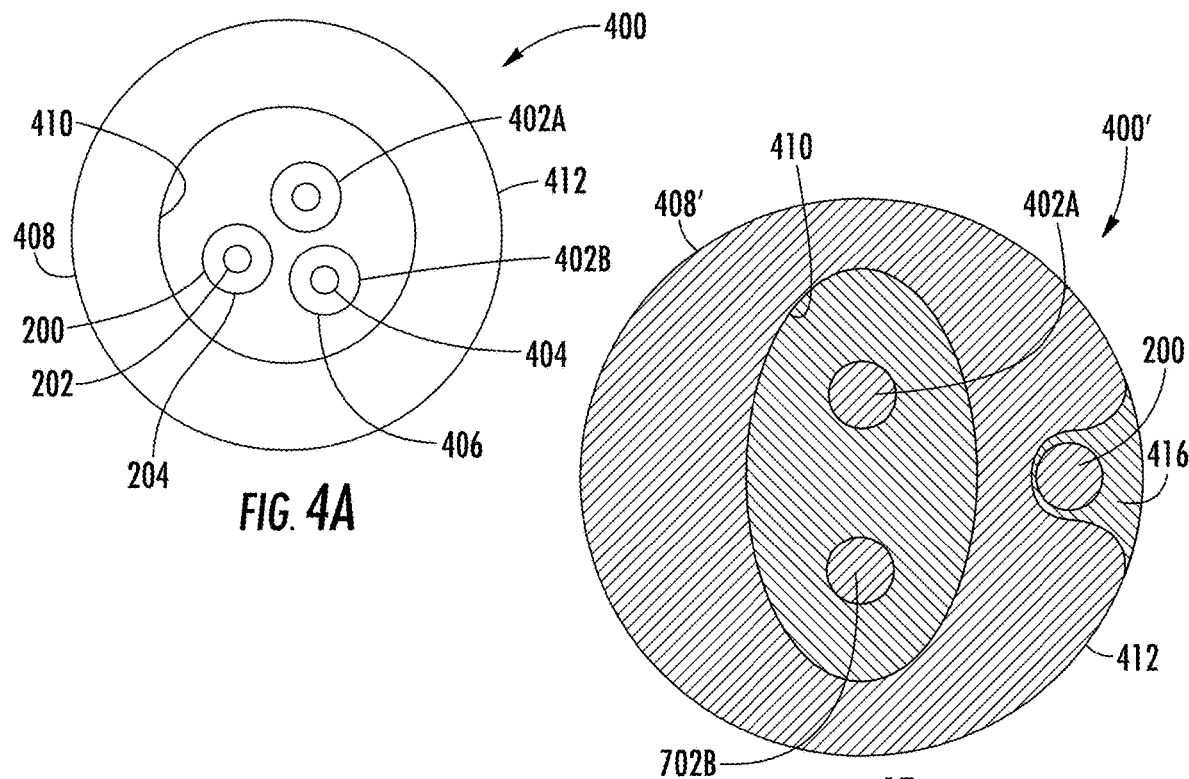
FIG. 4A
FIG. 4B
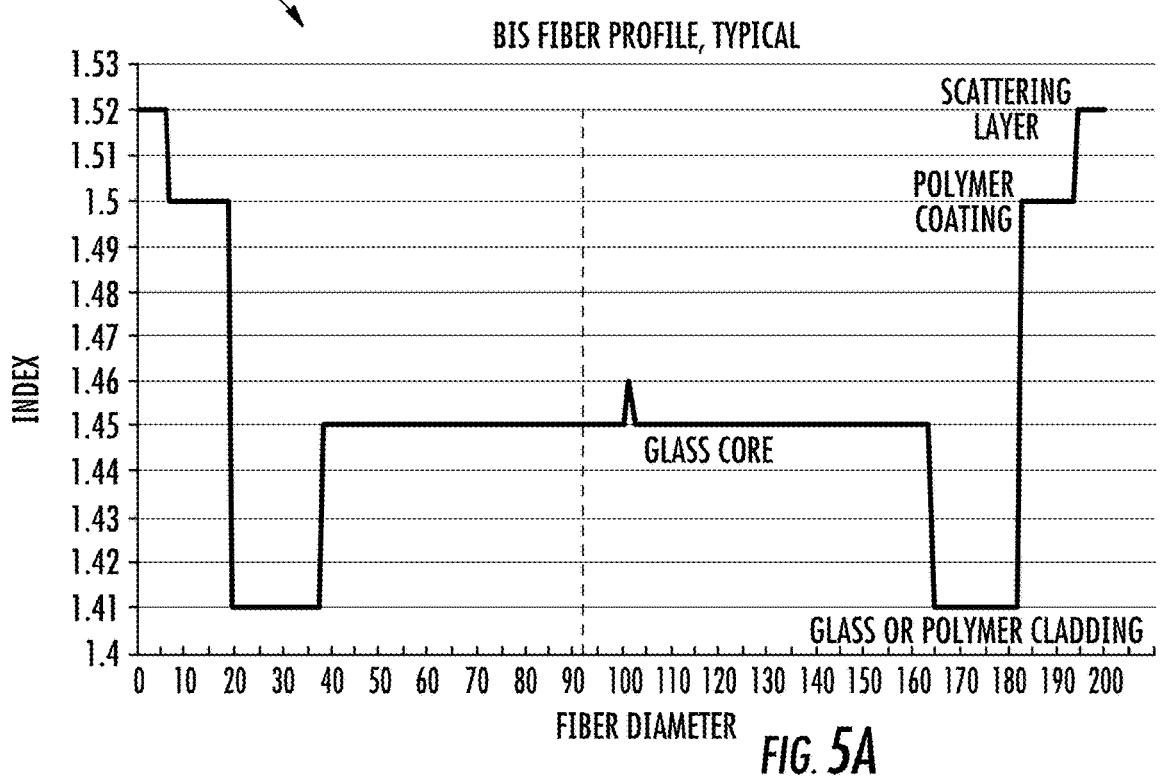
FIG. 5A

BEND INDUCED LIGHT SCATTERING FIBER AND CABLE ASSEMBLIES AND METHOD OF MAKING

CROSS REFERENCE TO RELATED APPLICATIONS

This application claims the benefit of priority of U.S. Provisional Application Ser. No. 62/594,798, filed Dec. 5, 2017, the content of which is relied upon and incorporated herein by reference in its entirety.

BACKGROUND

The disclosure relates to optical fibers, and more particularly to a bend induced light scattering fiber and method of making.

Optical fibers are used for a variety of applications where light needs to be delivered from a light source to a remote location. Optical telecommunication systems, for example, rely on a network of optical fibers to transmit light from a service provider to system end-users. Because optical fibers are typically designed to efficiently deliver light from one end of the optical fiber to the other end of the optical fiber over long distances, very little light escapes from the sides of the typical optical fiber. However, tight bends (i.e., kinks) in optical fibers may adversely affect performance of the optical fiber, and/or damage the optical fiber.

Fiber optic cable assemblies may range in size and complexity from single-fiber jumpers to multi-fiber harnesses. These cable assemblies are typically used to interconnect equipment in high-speed networks. FIGS. 1A-1B are views of network cables (e.g., patch cords 100) used in fiber optic equipment. More specifically, FIG. 1A is a perspective view of an equipment rack 102 supporting patch cords 100, and FIG. 1B is a perspective view of an under-floor cable tray 104 supporting patch cords 100. Large quantities of these patch cords 100 may create congestion and clutter, as may occur in data centers and similar network locations. Network operators frequently need to change connections to accommodate moves, additions, and changes in the network. However, operators find it difficult to trace a particular patch cord 100 from the source to the receiver (e.g., ends of the patch cords 100) when the network location is congested, as illustrated in FIGS. 1A and 1B. Further, identifying the location of tight bends within a fiber optic cable, or even identifying the fiber optic cable itself, can be challenging, especially among large quantities of patch cords 100.

To trace patch cords 100, some optical fibers (e.g., optical tracing fibers) include a core with nanovoids to scatter light within and from the core. For example, certain optical fibers scatter light at the core to the cladding interface using laser ablations or photochemical ink dots within the core. However, in standard multimode optical fibers, visible light bound in the core is not available for scattering, except due to Rayleigh scattering which is insufficient for lighting applications (even when the core includes a large amount of Germania).

No admission is made that any reference cited herein constitutes prior art. Applicant expressly reserves the right to challenge the accuracy and pertinency of any cited documents.

SUMMARY

Disclosed is a bend induced light scattering (BIS) optical fiber and method of making. The BIS optical fiber includes a core of pure silica that is devoid of nanovoids, and a cladding surrounding the core. The core has a first index of refraction, and the cladding has a second index of refraction that is lower than the first index of refraction of the core. The first index of refraction of the core and the second index of refraction of the cladding are configured to maintain light within the core when the BIS optical fiber is unbent in a light retaining position and to emit light from the core to the cladding at a bend in the BIS optical fiber when the radius of curvature of the bend is less than a critical radius of curvature and the BIS optical fiber is in a light emitting position. The BIS optical fiber is selectively movable from the light emitting position in which the radius of curvature is less than the critical radius of curvature and the light retaining position in which the radius of curvature is greater than the critical radius of curvature without damaging the core or the cladding of the BIS optical fiber. As the core of the BIS optical fiber is devoid of nanovoids, the light is not scattered along substantially straight or substantially unbent portions of the BIS optical fiber, which increases the emission intensity at the bent portions. Accordingly, the BIS optical fiber is configured to diffuse light only by mechanical macrobending of the BIS optical fiber. The BIS optical fiber can act as both a light scattering fiber and its own non-scattering delivery fiber at long distances without splices because, when bent, the BIS optical fiber may still be still act as both a light scattering fiber and a non-scatting delivery fiber. This mechanical action may make switching on and off easier than with electrical circuits acting on the laser. The BIS optical fiber may also reduce cost in laser circuitry, laser cooling, and/or durability.

One embodiment of the disclosure relates to a BIS optical fiber. The BIS optical fiber includes a core comprising pure silica and being devoid of nanovoids, where the core has a first index of refraction. The BIS optical fiber further includes a cladding surrounding the core, where the cladding has a second index of refraction that is lower than the first index of refraction of the core. The first index of refraction of the core and the second index of refraction of the cladding are configured to maintain light within the core when the BIS optical fiber is unbent in a light retaining position and to emit light from the core to the cladding at a bend in the BIS optical fiber when the radius of curvature of the bend is less than a critical radius of curvature and the BIS optical fiber is in a light emitting position. The BIS optical fiber is selectively movable from the light emitting position in which the radius of curvature is less than the critical radius of curvature and the light retaining position in which the radius of curvature is greater than the critical radius of curvature without damaging the core or the cladding of the BIS optical fiber An additional embodiment of the disclosure relates to an optical communication cable assembly. The optical communication cable assembly includes a cable comprising a jacket and at least one data transmission fiber, a first connector at a first end of the cable, a second connector at a second end of the cable, and a first bend-induced light scattering (BIS) optical fiber positioned within the jacket. The first BIS optical fiber includes a first end positioned proximate the first connector and a second end positioned proximate the second connector. The first BIS optical fiber further includes a core comprising pure silica and being devoid of nanovoids, where the core has a first index of refraction. The first BIS optical fiber further includes a cladding surrounding the core, the cladding having a second index of refraction that is lower than the first index of refraction of the core. The first index of refraction of the core and the second index of refraction of the cladding are configured to maintain light within the core when the BIS optical fiber is unbent in a light retaining position and to emit light from the core to the cladding at a bend in the BIS optical fiber when the radius of curvature of the bend is less than a critical radius of curvature and the BIS optical fiber is in a light emitting position. The BIS optical fiber is selectively movable from the light emitting position in which the radius of curvature is less than the critical radius of curvature and the light retaining position in which the radius of curvature is greater than the critical radius of curvature without damaging the core or the cladding of the BIS optical fiber.

An additional embodiment of the disclosure relates to a method of manufacturing a BIS optical fiber. The method includes forming a core including pure silica and being devoid of nanovoids, where the core has a first index of refraction. The method further includes forming a cladding around the core, where the cladding has a second index of refraction that is lower than the first index of refraction of the core. The first index of refraction of the core and the second index of refraction of the cladding are configured to maintain light within the core when the BIS optical fiber is unbent in a light retaining position and to emit light from the core to the cladding at a bend in the BIS optical fiber when the radius of curvature of the bend is less than a critical radius of curvature and the BIS optical fiber is in a light emitting position. The BIS optical fiber selectively movable from the light emitting position in which the radius of curvature is less than the critical radius of curvature and the light retaining position in which the radius of curvature is greater than the critical radius of curvature without damaging the core or the cladding of the BIS optical fiber Additional features and advantages will be set forth in the detailed description which follows, and in part will be readily apparent to those skilled in the art from that description or recognized by practicing the embodiments as described herein, including the detailed description which follows, the claims, as well as the accompanying drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 4A is a cross-sectional view of an alternative embodiment of the BIS optical fiber of FIGS. 2A-3B positioned inside a jacket of a cable;

FIG. 4B is a cross-sectional side view of an alternative embodiment of the BIS optical fiber of FIGS. 2A-3B positioned within a jacket of a cable;

FIG. 5A is a chart illustrating a typical index of refraction profile for the BIS optical fiber of FIGS. 2A-4B;

DETAILED DESCRIPTION

Figure 1A:
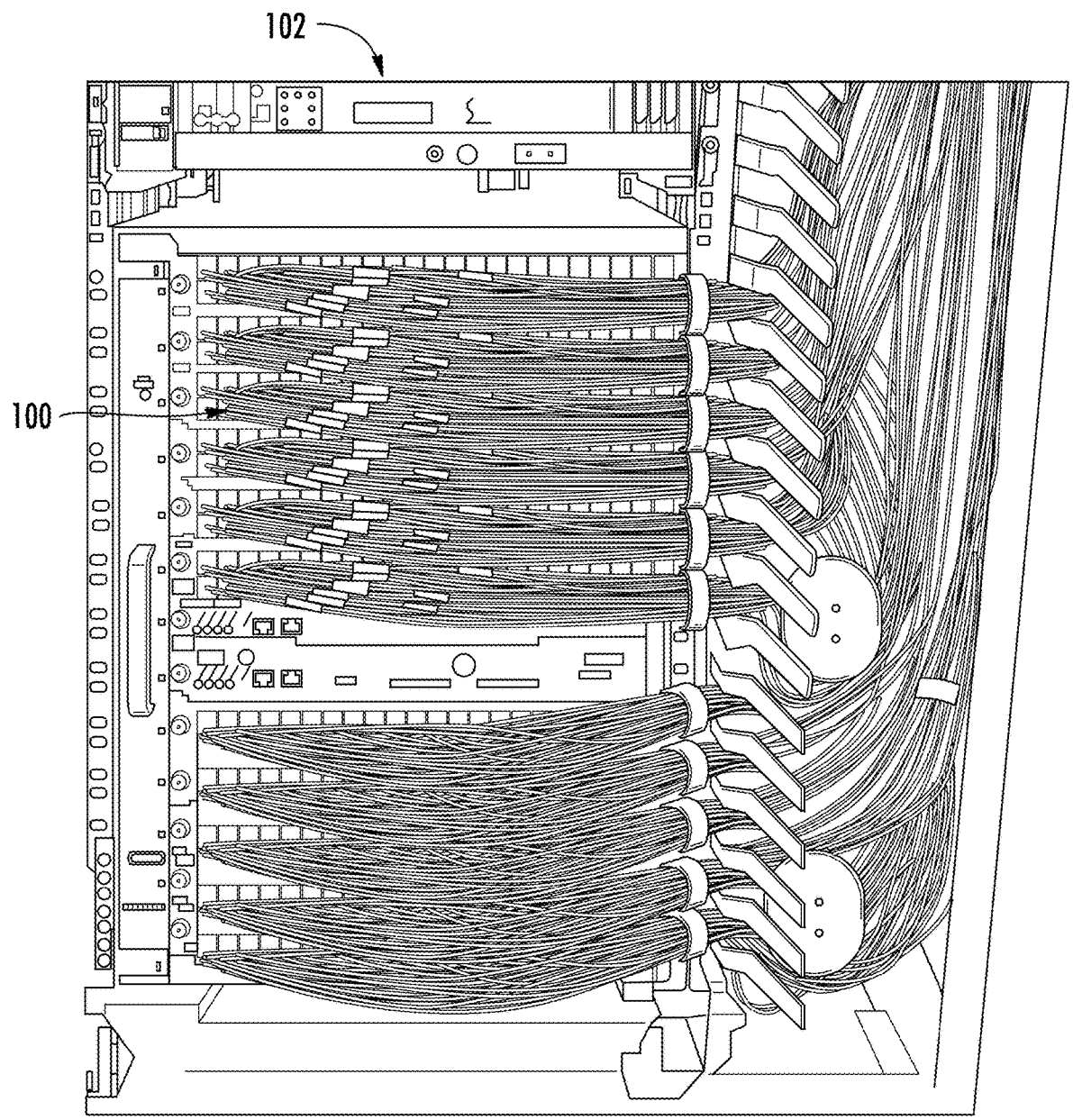
FIG. 1A is a perspective view of an equipment rack supporting patch cords.
Figure 1B:
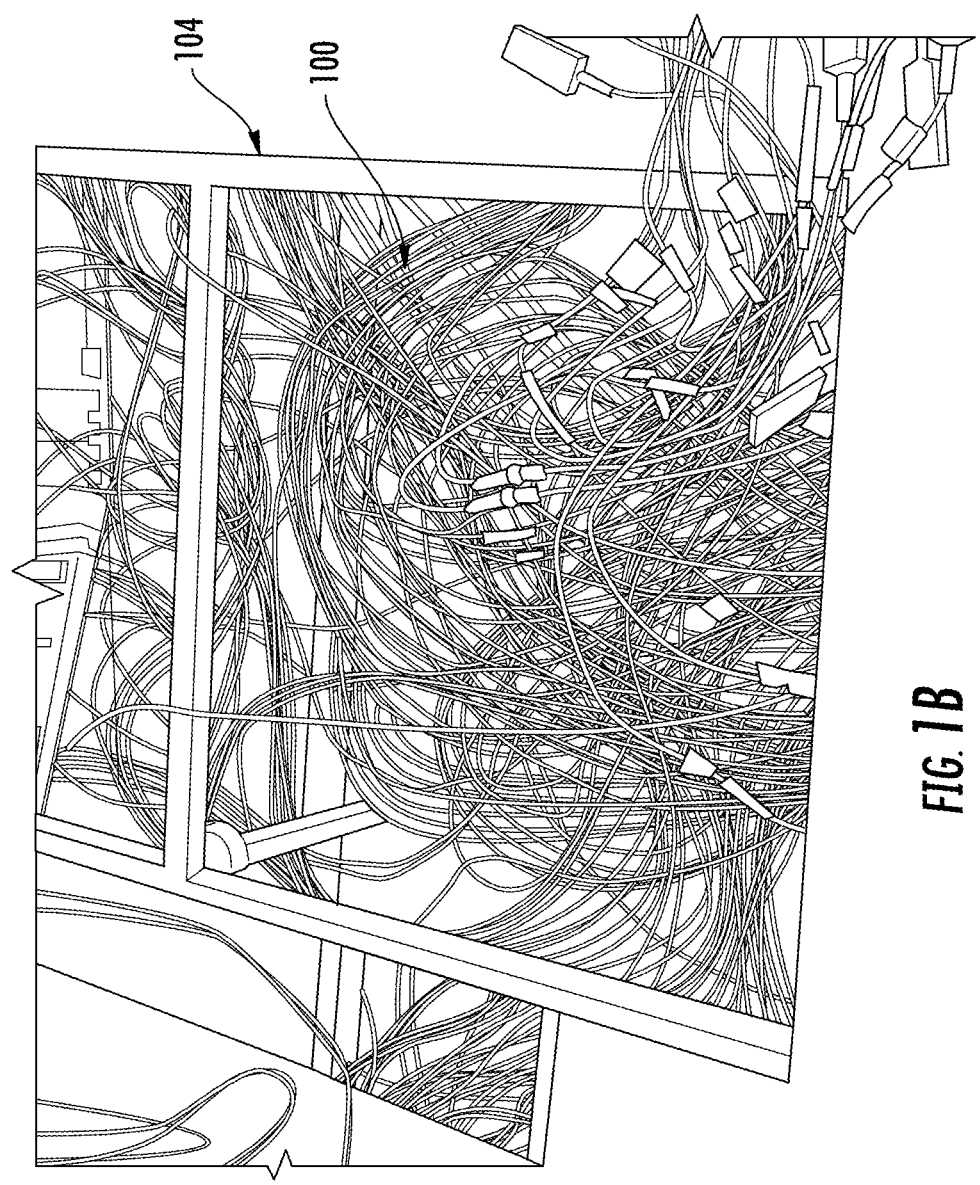
FIG. 1B is a perspective view of an under-floor cable tray supporting patch cords.

Reference will now be made in detail to the present preferred embodiments, examples of which are illustrated in the accompanying drawings. Whenever possible, the same reference numerals will he used throughout the drawings to refer to the same or like parts.

As used herein, the terms "optical communication," "in optical communication," and the like mean, with respect to a group of elements, that the elements are arranged such that optical signals are passively or actively transmittable therebetween via a medium, such as, but not limited to, one or more optical fibers, ports, free space, index-matching material (e.g., structure or gel), reflective surface, connectors, or other light directing or transmitting means.

As used herein, it is intended that the term "optical fibers" includes all types of single mode and multi-mode light waveguides, including optical fibers that may be coated, uncoated, colored, buffered, ribbonized and/or have other organizing or protective structures, such as a cable jacket, one or more tubes, strength members or the like.

Disclosed is a bend induced light scattering (BIS) optical fiber and method of making. The BIS optical fiber includes a core of pure silica that is devoid of nanovoids, and a cladding surrounding the core. The core has a first index of refraction, and the cladding has a second index of refraction that is lower than the first index of refraction of the core. The first index of refraction of the core and the second index of refraction of the cladding are configured to maintain light within the core when the BIS optical fiber is unbent in a light retaining position and to emit light from the core to the cladding at a bend in the BIS optical fiber when the radius of curvature of the bend is less than a critical radius of curvature and the BIS optical fiber is in a light emitting position. The BIS optical fiber is selectively movable from the light emitting position in which the radius of curvature is less than the critical radius of curvature and the light retaining position in which the radius of curvature is greater than the critical radius of curvature without damaging the core or the cladding of the BIS optical fiber. As the core of the BIS optical fiber is devoid of nanovoids, the light is not scattered along substantially straight or substantially unbent portions of the BIS optical fiber, which increases the emission intensity at the bent portions. Accordingly, the BIS optical fiber is configured to diffuse light only by mechanical macrobending of the BIS optical fiber.

The BIS optical fiber can act as both a light scattering fiber and its own non-scattering delivery fiber at long distances without splices because, when bent, the BIS optical fiber is both a step index multimode fiber and a light scattering fiber. This mechanical action may make switching on and off easier than with electrical circuits acting on the laser. The BIS optical fiber may also reduce cost in laser circuitry, laser cooling, and/or durability.

Figure 2A:
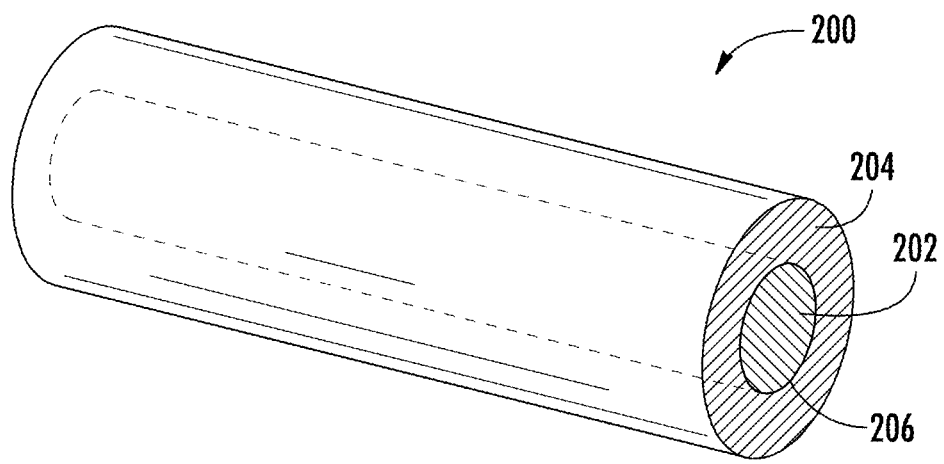
FIG. 2A is a schematic cross-sectional perspective view of a section of an example embodiment of a BIS optical fiber.
Figure 2B:
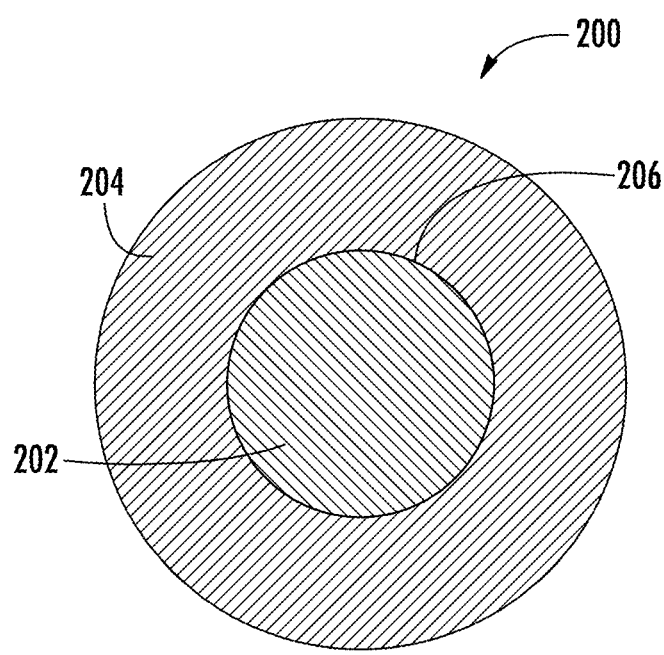
FIG. 2B is a schematic cross-sectional view of the BIS optical fiber of FIG. 2A.

FIGS. 2A-2B are views of an example embodiment of a BIS optical fiber 200 (may also be referred to as a BIS fiber). The BIS optical fiber 200 may be a single mode fiber or a multimode fiber. For example, the BIS optical fiber 200 may be a multimode fiber, a graded index optical fiber, a step index optical fiber, a single mode triangular index fiber, a step-index multimode fiber, or a graded-index multimode fiber. In certain embodiments, the BIS optical fiber 200 is configured to function, when bent, as a step index multimode fiber and concurrently as a light scattering fiber. In certain embodiments, the BIS optical fiber 200 is included in an endpoint traceable optical communication cable assembly, as described in more detail below with reference to FIGS. 9A-11.

The BIS optical fiber 200 includes a core 202 (may also be referred to as a core layer, waveguide core, fiber core, etc.) with a first index of refraction. The core 202 is surrounded by a cladding 204 (may also be referred to as a cladding layer, fiber cladding, etc.) with a second index of refraction that is lower than the first index of refraction of the core 202. The cladding 204 closely surrounds the core 202 to maintain light within the BIS optical fiber 200 by total internal reflection (e.g., when the BIS optical fiber 200 is substantially unbent) due to the difference in the index of refraction of the core 202 and the cladding 204. In this way, as the light travels along the BIS optical fiber 200, an interface 206 between the core 202 and the cladding 204 retains light within the core 202 due to total internal reflection at the interface 206 (e.g., when the BIS optical fiber 200 is substantially unbent).

The core 202 is devoid of nanovoids (e.g., airlines, dopants, germanium, laser ablations, etc.) or other similar nano-sized structures such that the BIS optical fiber 200 does not side scatter light when the BIS optical fiber 200 is in a substantially unbent or substantially straight orientation (may also be referred to as a zero-bend portion). As used herein, the term "devoid of nanovoids" and similar language when used with reference to the core 202 of the BIS optical fiber 200 means without structural gaps or defects greater than 5 nm in a cross-sectional diameter or length in the core 202. The term "devoid of nanovoids" includes, for example, a fiber core 202 of the BIS optical fiber 200 that has no scattering centers of any size (e.g., in a silica core) or a cross-sectional area ratio in the core 202 of void to fiber of less than or equal to 0 to $1 \times 10^{-5}$. In one embodiment, a BIS optical fiber 200 when bent above a bending radius of 10 mm has a 10 dB extinction of 30 m or greater, and when bent below a bending radius of 10 mm has a side emission of 0.1 dB of the total launch power up to 30 dB. As used herein, the terms "unbent", "substantially unbent", "straight", and "substantially straight", when used with reference to the BIS optical fiber 200, means a curvature of about zero and/or a radius of curvature equal to or greater than the critical radius of curvature of the BIS optical fiber 200. Similarly, as used herein, the terms "bent" or "bend" when used with reference to the BIS fiber means a curvature of greater than zero and/or a radius of curvature less than the critical radius of curvature of the BIS optical fiber 200.

The BIS optical fiber 200 is selectively movable from a light emitting position in which the radius of curvature of the bend is less than a critical radius of curvature and a light retaining position in which the radius of curvature of the bend is greater than a critical radius of curvature. Further, the BIS optical fiber 200 is selectively movable from the light emitting position to the light retaining position without damaging the core 202 or cladding 204 of the BIS optical fiber 200.

In certain embodiments, the core 202 includes a pure silica and/or unused SMF (single-mode optical fiber) core cane. In particular, the core 202 comprises undoped pure silica glass devoid of dopants, such as Ge (germanium), Al (aluminum), and/or P (phosphorous). In certain embodiments, the core 202 has a diameter between about 80 μm (microns) and about 250 μm, in other embodiments the core 202 has a diameter between about 100 microns and about 125 microns, and in other embodiments the core 202 has a diameter of about 125 microns. Cores 202 that are significantly smaller than 125 microns in diameter may be subject to damage from handling and it may be more difficult to couple light into such small diameter cores 202. Cores 202 that are significantly larger (e.g., larger than 250 microns in diameter) may be more likely to suffer damage when bent.

In certain embodiments, the cladding 204 has a diameter less than 250 microns (e.g., about 200 microns). For example, in certain embodiments the cladding 204 is glass or a polymer having a diameter less than 250 microns (e.g., about 200 microns). This reduces the eccentricity (increases the concentricity) between the cladding diameter and the glass core diameter. With better concentricity, the fiber connectors may have better alignment between input fiber cores and output fiber cores. This leads to higher coupling efficiency and lower variability in coupling efficiency, which may increase the optical power visible (in traceable fiber applications) and/or reduce yield hit in manufacturing.

In certain embodiments, the cladding 204 comprises glass (e.g., fluorinated silica (SiO$_2$) glass) and/or a polymer (e.g., fluoro-acrylate). In certain embodiments, the cladding 204 comprises one or more coatings, such as one or more fluorinated acrylate coatings (e.g., deposited during a fiber draw manufacturing step). In certain embodiments, the cladding 204 comprises a diameter between about 100 μm and about 350 μm. In other embodiments, the cladding 204 comprises a first fluorinated acrylate cladding layer with a diameter between about 100 μm and about 350 μm, between about 110 μm and 155 μm, or at about 155 μm, and a second acrylate cladding layer with a diameter between about 140 to 250 μm, between about 180 to 240 μm, between about 190 to 200 μm, or at about 195 μm. Thus, in one embodiment the cladding comprises a first fluorinated acrylate cladding layer with diameter between 100 to 170 μm and a second acrylate cladding layer with a diameter between 140 to 250 μm.

In certain embodiments, the BIS optical fiber 200 includes a scattering layer surrounding the cladding layer 204. For example, in some embodiments an ink layer surrounds the cladding layer 204 to promote light scattering from the cladding layer 204. It is noted that, in certain embodiments, when used as a delivery fiber, the scattering layer is omitted (i.e., the BIS optical fiber 200 is devoid of the scattering layer). In certain embodiments, the cladding includes a UV curable material and/or acrylate with a scattering material incorporated therein, such as, for example, an ink (e.g., titania) and/or a phosphor mixture. In certain embodiments, the cladding layer 204 includes a first layer without a scattering material and a second, outer layer that includes a scattering material, such as a scattering ink. In certain embodiments, the cladding layer 204 includes polymer OF-138, which may provide a number of advantages including robustness.

Figure 3A:
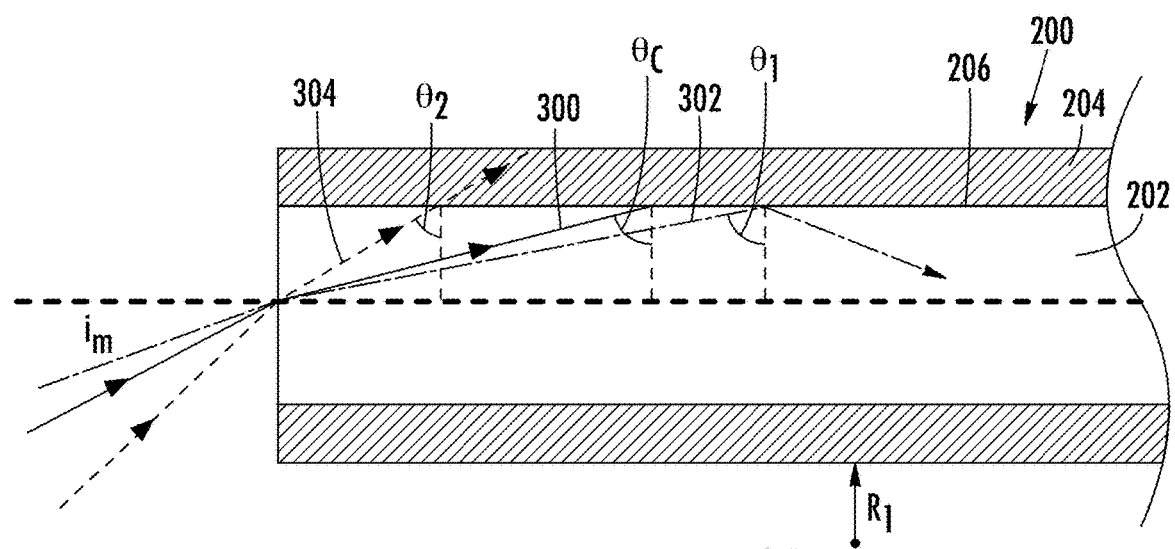
FIG. 3A is a schematic cross-sectional side view of the BIS optical fiber of FIGS. 2A-2B in a substantially straight orientation illustrating propagation of a light path through a core of the optical fiber by total internal reflection.

FIG. 3A is a schematic cross-sectional side view of the BIS optical fiber 200 of FIGS. 2A-2B in a substantially straight orientation (may also be referred to as a light retaining position) illustrating propagation of light paths (e.g., light paths 300, 302 and 304) through the core 202 of the BIS optical fiber. As previously noted, light is propagated through the BIS optical fiber 200 by total internal reflection when the BIS optical fiber 200 is unbent in a light retaining position due to the differing indices of refraction between the core 202 and the cladding layer 204. If the angle of incident of the light at the interface 206 between the core 202 and the cladding layer 204 is above a critical angle $\theta_c$, the light will reflect and propagate through the core 202. However, if the angle of incident of light at the interface 206 is below the critical angle $\theta_c$ (e.g., when the BIS optical fiber 200 is in a light emitting position), the light will refract and exit the core 202. Thus, the critical angle $\theta_c$ (illustrated by critical light ray 300) is the minimum or smallest angle of incidence at which light is reflected and smaller incidence angles will cause the light to be refracted (instead of reflected) and to exit the core 202.

For example, a first light ray 302 traveling through the core 202 reaches the interface 206 at a first angle $\theta_1$, which is greater than the critical angle $\theta_c$, and, as such, the first light ray 302 is reflected at the interface 206, thereby propagating through the core 202. However, a second light ray 304 traveling through the core 202 reaches the interface 206 at a second angle $\theta_2$, which is less than the critical angle $\theta_c$, and, as such, the second light ray 304 is refracted (not reflected) at the interface 206, thereby exiting the core 202 into the cladding 204.

Figure 3B:
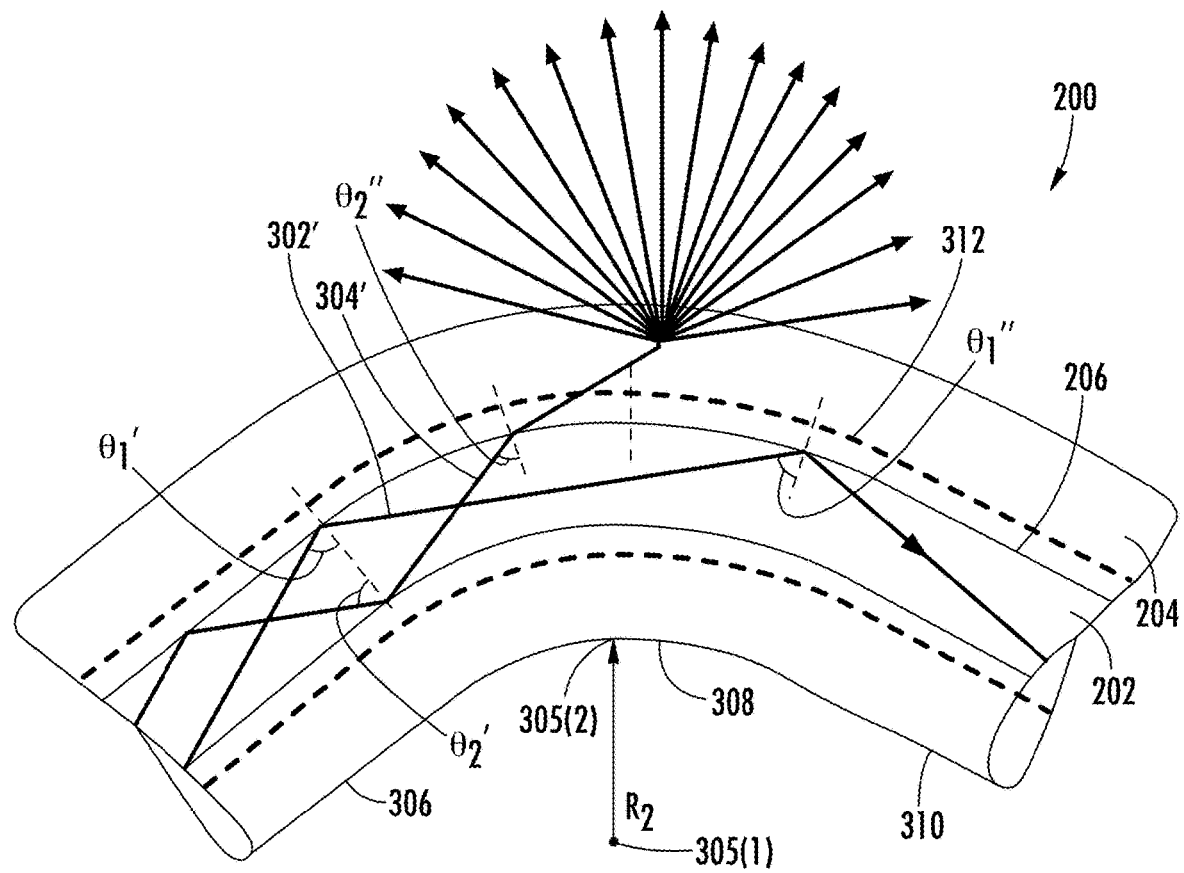
FIG. 3B is a schematic cross-sectional side view of the BIS optical fiber of FIG. 2A-2B in a bent orientation illustrating a light path exiting a core of the optical fiber by macrobending.

FIG. 3B is a schematic cross-sectional side view of the BIS optical fiber 200 of FIG. 2A-2B in a bent orientation (may also be referred to as a light emitting position) illustrating a second light ray 304' exiting a core 202 of the BIS optical fiber 200 by macrobending to decrease the angle of incidence (e.g., $\theta_{2''}$) of the second light ray 304'. In particular, the BIS optical fiber 200 is configured such that when it is substantially straight or bent to a radius of curvature equal to or greater than a critical radius of curvature (e.g., in a light retaining position), the light propagates through the BIS optical fiber 200. In other words, the first index of refraction of the core and the second index of refraction of the cladding are configured to maintain light within the core at the bend when the radius of curvature of the bend is greater than a critical radius of curvature. The BIS optical fiber 200 is also configured such that when it is bent to a radius of curvature that is less than the critical radius of curvature (e.g., in a light emitting position), the light exits the core 202 at the cladding layer 204 at the bend. The BIS optical fiber 200 is selectively movable from the light emitting position in which the radius of curvature is less than the critical radius of curvature and the light retaining position in which the radius of curvature is greater than the critical radius of curvature without damaging the core 202 or the cladding 204 of the BIS optical fiber 200.

In some embodiments, the critical radius of curvature is between about 1.5 mm and about 5 mm as measured from a center 305(1) of the bend to an exterior surface 305(2) of cladding layer 204. Accordingly, bend radii smaller than the critical radius of curvature result in light emission from the core 202 of the BIS optical fiber 200. For multimode fibers, the actual critical radius of curvature may be a critical bend range due to the highly multimoded nature of the core of the BIS fiber (e.g., a 125 μm core BIS fiber can support 600-700 modes at 532 nm compared with a single mode fiber that can carry one mode at 1550 nm wavelength).

In some cases, the critical radius of curvature $R_c$ for a BIS fiber is approximated by:

$$R_c = \frac{3n_1^2 \lambda}{4\pi [n_1^2 - n_2^2]^{3/2}} \qquad \text{Equation 1}$$

wherein $R_c$ is the critical radius of curvature, $n_1$ is the first index of refraction of the core of the BIS optical fiber 200 and $n_2$ is the second index of refraction of the cladding of the BIS optical fiber 200. In certain embodiments, for example, the BIS optical fiber 200 is a multimode fiber with a 125 μm HPFS (high purity fused silica) core with a first index of refraction ($n_1$) between 1.46 and 1.47 measured at 532 nm, a cladding with a diameter between about 155 μm and 160 μm and a second index of refraction ($n_2$) between 1.36 and 1.40 (e.g., 1.38) measured at 589 nm, and a critical radius between about 1.9 and 3 mm. In such an embodiment, the BIS optical fiber 200 emits 0.21 dB of the launch power at a bend radius below 2.6 mm, and in particular emits 0.21 dB at a bend radius 2.6 mm, emits 0.25 dB at a bend radius 2.0 mm and emits 0.4 dB at a bend radius 1.0 mm. In certain embodiments, the multimode fiber includes a 8-10 μm single mode core within the larger 125 μm multimode core. In certain embodiments, the single mode core is used to measure the fiber for breaks (e.g., after extrusion into a fiber optic cable).

In the above embodiments, dB loss is measured by the fraction of light emitted to light launched (i.e., dB loss=10*log (launch power/emission power)). In particular, dB loss can be determined by inserting a known launch power into a fiber, and then using sensors and meters to measure either the light scattered by side scaler measurements or the light transported through the fiber.

Each mode has a critical radius of curvature at which light will begin to exit the core (couple to the cladding layer) and then scatter out from the BIS optical fiber. As the BIS optical fiber is bent, the effective refractive index changes according to Equation 1 above.

The indices of refraction n1 and n2 for the core 202 and cladding 204, respectively, effectively change with bends in radius of curvature due to the changes in the angle of incidence of the internal reflection. As the fiber bends, the n2 changes relative to n1 causing coupling of light from the core 202 to the cladding 204 and then scattering. In particular, as n2 approaches n1, coupling from the core mode to the cladding mode occurs at different rates for each mode; however, in general tighter bends (with a smaller bend radius) increase mode coupling from the core to the cladding. In other words, bending decreases the difference in propagation constants from core to cladding modes. Each mode will have its own critical radius of curvature (Rc) because each mode will have its own coupling coefficient. Coupling coefficients for each mode β are a product of the effective refractive index and the vacuum wavenumber. Scattering emission will change with bend diameter, where the critical radius of curvature will depend on the core diameter, the indices of refraction, and/or the mode launch light. In other words, the NA and the radius of curvature are related to emission.

Referring again to FIG. 3B, as an example a first light ray 302' propagates through the BIS optical fiber 200 and intersects the interface 206 at a first substantially straight portion 306 of the BIS optical fiber 200 at a first angle of incidence $\theta_1'$ which is greater than the critical angle $\theta_c$, passes through a bent portion 308, and then intersects the interface 206 at a second substantially straight portion 310 at a second angle of incidence $\theta_1''$ which is also greater than the critical angle $\theta_c$.

A second light ray 304' propagates through the BIS optical fiber 200 and intersects the interface 206 at the first substantially straight portion 306 at a first angle of incidence $\theta_2'$ which is greater than the critical angle $\theta_c$, and then intersects the interface 206 at the bent portion 308 at a second angle of incidence $\theta_2''$ which is less than the critical angle $\theta_c$. The light exits the core 202 at the bent portion 308 and enters the cladding 204. The cladding 204 (i.e., cladding layer) may include light scattering mechanisms (may also be referred to as scattering structures), such that the light is scattered in all directions. Light scattering mechanisms may include a UV curable material and/or acrylate with ink (e.g., titania) and/or a phosphor mixture within the cladding layer 204 or on an external surface of the cladding layer 204. For example, in certain embodiments, the light scattering mechanism includes an acrylate filled with a light scattering ink and applied outside of the cladding layer 204, which may be made of a higher index protective acrylate. In some embodiments, the cladding layer 204 may include an internal scattering layer 312 at which light begins to scatter.

As noted above, the BIS optical fiber 200 is configured to diffuse light by mechanical macrobending of the BIS optical fiber 200 (may also be referred to as macrobending emission, macrobending loss, tilt, etc.). Bending of the BIS optical fiber 200 is a reversible and repeatable action. When the radius of curvature decreases below the critical radius of curvature, the light is scattered and as the radius of curvature increases (i.e., the BIS is straightened) above the critical radius of curvature $R_c$, all or most of the light is bound in the non-scattering core 202 by total internal reflection. In other words, the radius of curvature provides a lever to turn on and off the emission (and side scattering) of light. This mechanical action may make switching on and off easier than with electrical circuits acting on the laser. The BIS optical fiber 200 may also reduce cost in laser circuitry, laser cooling, and/or durability. For example, the laser can be kept on and allowed to reach a steady state with cooling, and the location at which the BIS optical fiber 200 emits light can be adjusted by macrobending only at the locations desired and, likewise, the timing of emission can be controlled by selective bending of the BIS optical fiber 200. The BIS optical fiber 200 diffuses light only at controlled locations and at controlled times (e.g., visible laser launch). As the core 202 of the BIS optical fiber 200 is devoid of nanovoids, the light is not scattered along the substantially straight portions 306, 310 of the BIS optical fiber 200, which increases the emission intensity at the bent portion 308.

In certain embodiments, the BIS optical fiber 200 may be used as a data transmission fiber that is also a light diffusing fiber when the optical fiber extends beyond a particular radius of curvature to identify kinks or bends in the fiber. This enables slow to rapid illumination rates down a length of a fiber (e.g., which may be deployed on a length of a consumer product). For a given laser launch condition, there is an optical cladding index and radius of curvature that will allow for partial, scalable, repeatable, and reversible (e.g., does not damage the fiber) emission of visible radiation only at bend locations. The BIS optical fiber 200 enables gradual illumination (may also be referred to as slow illumination) by mechanical means only, with no additional lights or electrical circuits.

The BIS optical fiber 200 can act as both a light scattering fiber and its own non-scattering delivery fiber at long distances without splices because, when bent, the BIS optical fiber 200 is both a step index multimode fiber and a light scattering fiber. The default function of the BIS optical fiber 200 is a large area step index multimode fiber (may also be referred to as a light pipe), but when bent near or below its critical radius of curvature for the wavelength of light in use, the BIS optical fiber 200 becomes a light diffusing fiber emitting visible light (e.g., at several hundreds of microwatts of visible light) at the bend. The dual purpose of the BIS optical fiber 200 enables remote location of a laser away from the desired lighting location without splicing of an additional delivery fiber. The BIS optical fiber 200 is its own delivery fiber for as long as is necessary for the application (e.g., flashing light in a consumer lighting application). Excess BIS optical fiber 200 can also be deployed into a lighting system to enable long term re-commission and possibly later use of the BIS optical fiber 200

A BIS optical fiber 200 held in tension may be pulled and released. In particular, a BIS optical fiber 200 may be pulled, which causes the radius of curvature to decrease to near or below the critical radius of curvature, thereby causing light to leak out and then be scattered within the outer cladding 204.

As noted above, the BIS optical fiber 200 includes a core 202 including pure silica and being devoid of nanovoids, where the core 202 has a first index of refraction. The BIS optical fiber 200 further includes a cladding 204 surrounding the core, where the cladding 204 has a second index of refraction lower than the first index of refraction of the core. The first index of refraction of the core and the second index of refraction of the cladding are configured to provide bend-only light emission from the core 202 to the cladding 204 when bent less than a critical radius of curvature.

FIG. 4A is a cross-sectional side view of the BIS optical fiber 200 of FIGS. 2A-3B positioned within a cable. FIG. 4B is a cross-sectional side view of an alternative embodiment of the BIS optical fiber of FIGS. 2A-3B positioned within a jacket of a cable. A cable 400 includes the BIS optical fiber 200 and one or more data transmission elements 402A, 402B (may also be referred to generally as data transmission elements 402). The BIS optical fiber 200 may be configured to transmit data, and similarly, the data transmission elements 402 may also comprise BIS optical fibers 200. The data transmission elements 402 may be of the same type or different types as compared to one another.

Generally, the data transmission element 402 is a structure capable of carrying a data signal from one end of the cable 400 to the other. The data transmission element 402 may be configured to transmit an electrical signal, for example, using a copper wire or other electrically conductive material. Alternatively, or in addition, the data transmission element 402 may be configured to transmit an optical signal by conducting electromagnetic waves such as ultraviolet, infrared, or visible light to carry data from one location to another. The data transmission elements 402 may be an optical transmission element having a core 404 and a cladding 406.

The jacket 408 of the cable 400 may be a hollow tube forming a conduit 410 that substantially surrounds the data transmission elements 402 and defines an outer surface 412 of the cable 400. Alternatively, the data transmission elements 402 may be partially or fully embedded within the jacket 408.

The jacket 408 may be formed from an extruded polymer material, and/or may include multiple layers of materials where the outermost layer defines the outer surface 412. Further, the cable 400 may include one or more strengthening members embedded within the material of the jacket 408 or located within the conduit 410. For example, the cable 400 may include an elongate strengthening member (e.g., a fiber or rod) located within the conduit 410 and running the length of the jacket 408, and that is formed from a material that is more rigid than the material of the jacket 408. The strengthening members may be metal, braided steel, glass reinforced plastic, fiber glass, fiber glass yarns or other suitable material. In various embodiments, the cable 400 may include a variety of other elements embedded in or surrounded by the jacket 408 depending on the intended use of a particular cable 400, including armor layers, moisture barrier layers, rip cords, etc. Additionally, the cable 400 may include other components such as steel armor and stranded and/or longitudinal strength elements. The cable 400 may be stranded, loose tube core cable construction, or other fiber optic cable construction.

Referring to FIG. 4A, the cable 400 also includes a BIS optical fiber 200 positioned within the conduit 410 of the jacket 408. The BIS optical fiber 200 is visible from an exterior of the cable 400. At least a portion of the jacket 408 is translucent or transparent to the tracer wavelength or wavelength range $\lambda_T$, or an optically visible shifted tracer wavelength or wavelength range $\lambda_T^*$, along at least a portion of a length of the cable 400. The BIS optical fiber 200 may be incorporated as part of the cable 400 in one of several configurations. For example, the BIS optical fiber 200 may be adjacent to the data transmission elements 402 inside a conduit 410 defined by the jacket 408. In yet other embodiments, the BIS optical fiber 200 may be mounted to the outer surface 412 of the jacket 408 or otherwise attached to the jacket 408. In other embodiments, the BIS optical fiber 200 may be incorporated partially or fully within the jacket 408, as shown in FIG. 4B. In particular, in FIG. 4B, the cable jacket 408' of the cable 400' includes a transparent portion 416 running at least a portion of the length of the cable 400, with the BIS optical fiber 200 positioned within the transparent portion 416.

Referring to FIGS. 4A-4B, in certain embodiments, the BIS optical fiber 200 acts as a tracing optical fiber. In such an embodiment, the BIS optical fiber 200 enables an operator to identify kinks or bends in the cable 400 and/or identify one end of the cable 400 by injecting light into the opposite end of the cable 400. The BIS optical fiber 200 may conduct nonvisible light or visible light, such as green light (e.g., at approximately 520 nm), red light, blue light, or a combination thereof. Green light may be used due to the relative high degree of sensitivity of the human eye to green light and because 520 nm may be the lowest loss part of the transmission spectrum for the BIS optical fiber 200.

In certain embodiments, at a zero-bend portion or at a radius of curvature greater than about 25 mm, no light (or minimal light) is dispersed from the BIS optical fiber 200. At a radius of curvature of less than approximately 25 mm, the BIS optical fiber 200 generates dispersed visible light. Noting that the preferred bend sensitivity of the data transmission elements 402 (e.g., optical data transmission fiber) utilized in a particular cable 400 will vary across applications, in certain embodiments, cables 400 are classified in terms of the relative bend sensitivities of the data transmission elements 402 (e.g., data transmission fiber) and the BIS optical fibers 200. In certain embodiments, the critical radius of curvature for generating dispersed visible light is greater than the critical radius of curvature for data transmission loss of the data transmission elements 402 above a particular percentage threshold (e.g., 1%, 5%, 10%, 20%, etc.). For example, where the data transmission elements 402 (e.g., optical data transmission fibers) are characterized by a bend sensitivity threshold at a data transmission radius of curvature $R_1$ below which there is a transmission loss of more than about 10%, the BIS optical fiber 200 can be engineered to disperse visible light at a bend sensitive radius of curvature $R_2$ that is slightly smaller than the data transmission radius of curvature $R_1$. In one embodiment, the bend sensitive radius of curvature $R_2$ is within approximately 5 mm of the bend sensitive data transmission radius of curvature $R_1$. In other embodiments, the bend sensitive radius of curvature $R_2$ is within approximately 2 mm of the bend sensitive data transmission radius of curvature $R_1$. In yet other embodiments, the bend sensitive radius of curvature $R_2$ is within approximately 1 mm of the bend sensitive data transmission radius of curvature $R_1$. Closer bend radii differences are also contemplated, as are larger bend radii differences. In this manner, there will be a bend-sensitive emission as the cable 400 approaches the bend sensitivity threshold of the data transmission element 402 (e.g., data transmission fiber).

In certain embodiments, it is contemplated that the BIS optical fiber 200 is selected such that (i) visible light at the tracer wavelength or wavelength range $\lambda_T$ is dispersed from zero-bend portions of the BIS optical fiber 200 at a luminance that is less than 10 cd/m$^2$ and that (ii) visible light $\lambda_T$, $\lambda_T^*$ is dispersed from bent portions of the BIS optical fiber 200, at bend radii of approximately 20 mm and below, at a luminance between approximately 80 cd/m$^2$ and approximately 200 cd/m$^2$. In other words, light scattered from the BIS optical fiber 200 will be emitted in locations where the cable assembly 100 is bent, providing for easy identification of cable kinks or sources of potential high macrobend loss in the data transmission element 402 (e.g., data transmission fiber). This could be particularly valuable when a jumper cable assembly is within a cluster of cables in a data center, i.e., where small bends are not otherwise easy to identify. For example, in one embodiment, it is contemplated that the BIS optical fiber 200 can be configured to disperse and scatter light at bend radii between about 2 mm and about 20 mm, i.e., scattering that is sufficient to permit visual identification of bends in the cable 400 at bend radii between about 2 mm and about 20 mm.

Figure 5B:
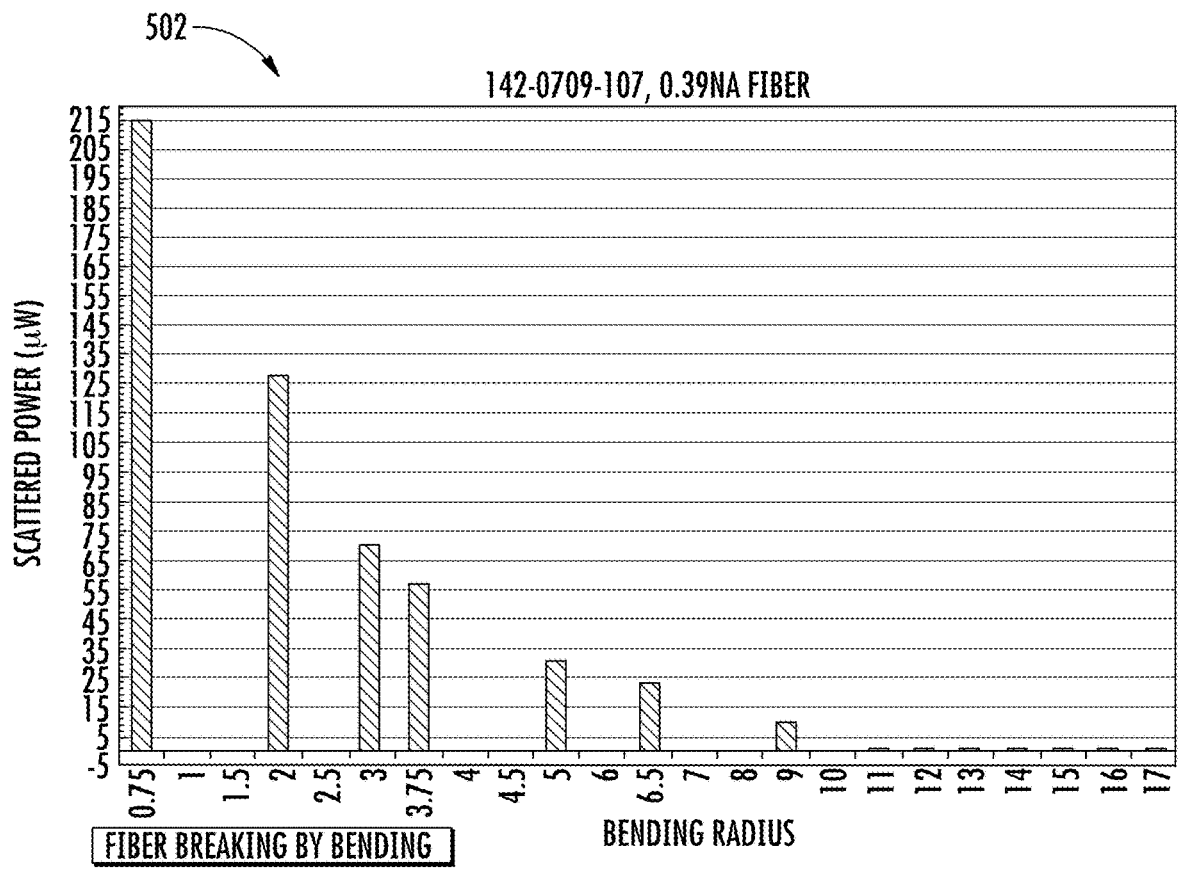
FIG. 5B is a chart illustrating measured scattered light versus bending radius of curvature for the BIS optical fiber of FIGS. 2A-4B.
Figure 5C:
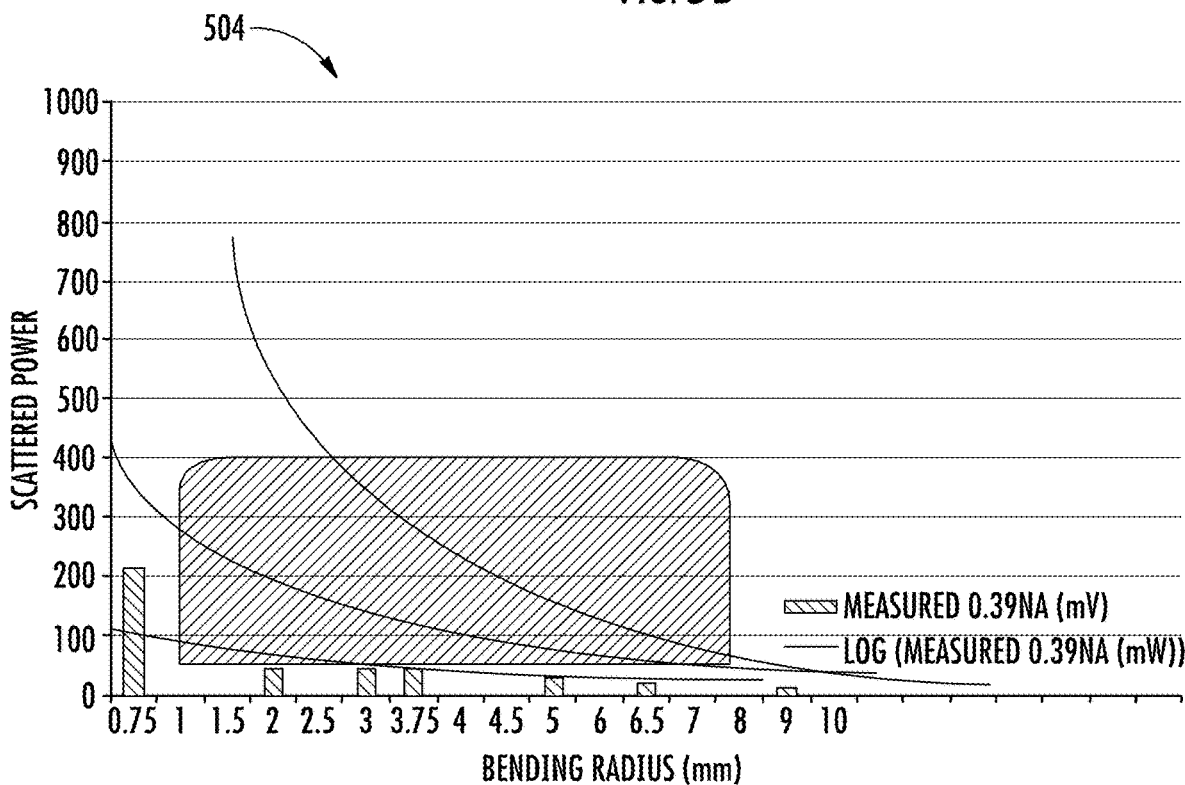
FIG. 5C is a chart illustrating an effect of a relationship between bending radius of curvature and scattering power of the BIS optical fiber of FIGS. 2A-4B by increasing a coating of a numerical aperture of the BIS optical fiber.

FIG. 5A is a chart 500 illustrating a typical index of refraction profile for the BIS fiber of FIGS. 2A-4B. The BIS optical fiber provides a macro bending threshold below which more and more core modes couple to the cladding modes. For example, FIG. 5B is a chart 502 illustrating measured scattered light versus bending radius of curvature for the BIS fiber of FIGS. 2A-4B. FIG. 5C is a chart 504 illustrating an effect of a relationship between bending radius of curvature and scattering power of the BIS optical fiber of FIGS. 2A-4B by increasing a numerical aperture of the BIS optical fiber. The numerical aperture (may also be referred to as an index of refraction step) can be defined by:

$$NA = \sqrt{n_{core}^2 - n_{clad}^2} \quad \text{Equation 2}$$

where NA is the numerical aperture, neon is the index of refraction of the core, and $n_{clad}$ is the index of refraction of the cladding. For a given radius of curvature, a larger NA will result in lower $R_c$ and thus lower loss. While $R_c$ is influenced by wavelength, for bends above $R_c$ loss is not a strong function of wavelength within the visible light range.

In certain embodiments using 520 nm light, the fiber numerical aperture (NA) is between about 0.2 and about 0.5 (e.g., between 0.22 and 0.5), which corresponds to critical bending radii between about 40 mm and 1 mm respectively. In certain embodiments, the NA is about 0.41. In certain embodiments, particularly for BIS optical fibers 200 with a glass cladding 204 (see FIG. 2), the NA is between about 0.15 and 0.25 (e.g., about 0.2 cladding to core NA). In certain embodiments, particularly for BIS optical fibers 200 (see FIG. 2) with a polymer cladding 204 (see FIG. 2), the NA is between about 0.30 and 0.45 (e.g., about 0.4 cladding to core NA) which allow for bends that, for example, fit into connectors and around lightbulb filaments, but still emit in the 0.2 to 0.5 lumens/mm range. In certain embodiments, the BIS optical fiber 200 is configured to produce light emissions of 0.2 to 2 dB of the total internal light propagation with macro bend radii of 2 mm to 3.5 mm over 1 mm to 75 mm of fiber length. For example, in one embodiment wherein the core has a diameter between about 80 μm and about 250 μm and the cladding has a diameter between about 100 μm to 350 μm, the light emitted from the core to the cladding is between about 0.2 dB and about 2 dB over 1 mm to 75 mm of fiber length at the bend when the radius of curvature of the bend is between about 2 mm to about 3.5 mm.

Claddings with higher NAs (e.g., above 0.51) may require bends that damage the coatings and or glass, while claddings with lower NAs (e.g., below 0.2) may leak too much light to be used as a delivery fiber. It is noted that most light will leak out at the first bend even at a very large bend diameter. However, there are a large range of NAs bend diameters, launch conditions and core diameters that can be used to optimize scattering brightness at any location down the BIS optical fiber.

Figure 6A:
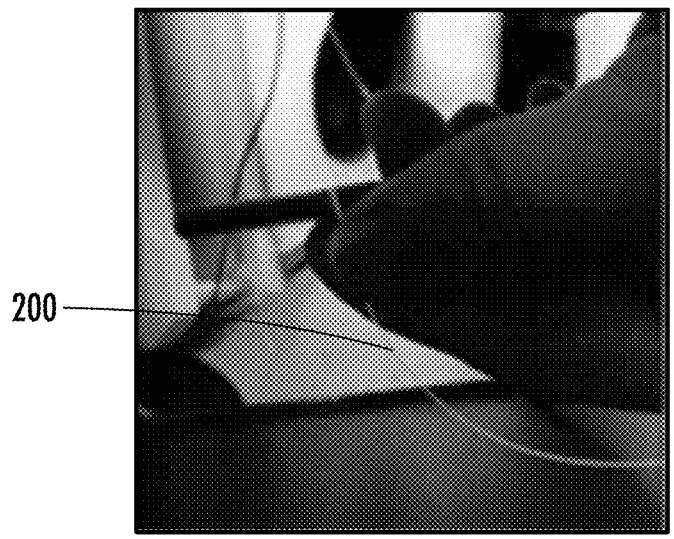
FIG. 6A is a perspective view of the BIS optical fiber of FIGS. 2A-4B illustrating performance in a substantially straight orientation with 520 nm light.
Figure 6B:
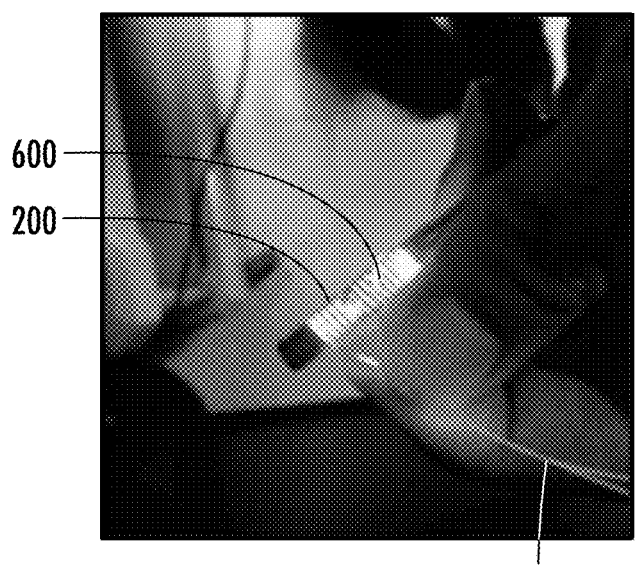
FIG. 6B is a perspective view of the BIS optical fiber of FIGS. 2A-4B illustrating performance in a bent orientation with 520 nm light, the BIS optical fiber coiled about 16 times around a rod with a 2.5 mm radius.

FIG. 6A is a perspective view of the BIS optical fiber 200 of FIGS. 2A-4B illustrating performance in a substantially straight orientation with 520 nm light. FIG. 6B is a perspective view of the BIS optical fiber 200 of FIGS. 2.A-4B illustrating performance in a bent orientation with 520 nm light, the bend portion 600 of the BIS optical fiber 200 coiled about 16 times around a rod with a 2.5 mm radius. It is noted that there is plenty of light for scattering again in the substantially straight portion 602 further down the BIS optical fiber 200 from the bend portion 600.

Figure 7A:
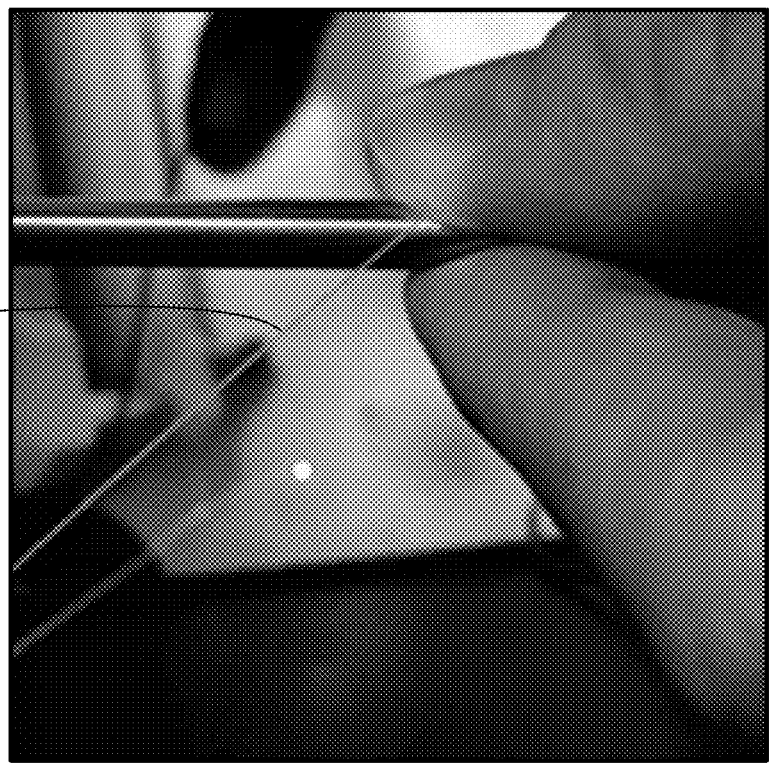
FIG. 7A is a perspective view of the BIS optical fiber of FIGS. 2A-4B illustrating performance in a substantially straight orientation with 520 nm
Figure 7B:
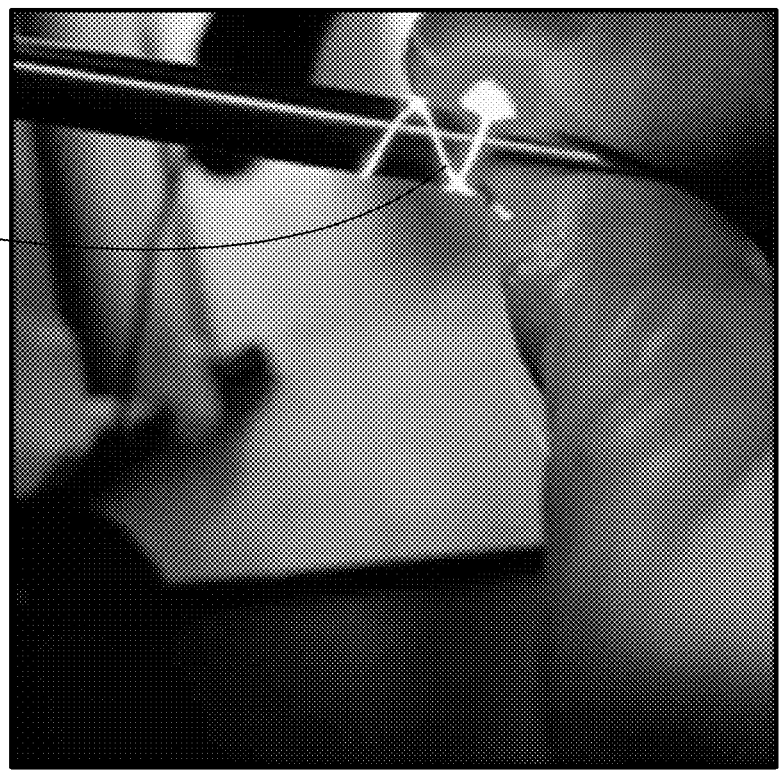
FIG. 7B is a perspective view of the BIS optical fiber of FIGS. 2A-4B illustrating performance in a bent orientation with 520 nm light, the BIS optical fiber coiled about 3 times around a rod with a 3 mm radius.

FIG. 7A is a perspective view of the BIS optical fiber 200 of FIGS. 2A-4B illustrating performance in a substantially straight orientation with 520 nm light. FIG. 7B is a perspective view of the BIS optical fiber 200 of FIGS. 2A-4B illustrating performance in a bent orientation with 520 nm light, the BIS optical fiber 200 coiled about 3 times around a rod with a 3 mm radius.

Figure 8:
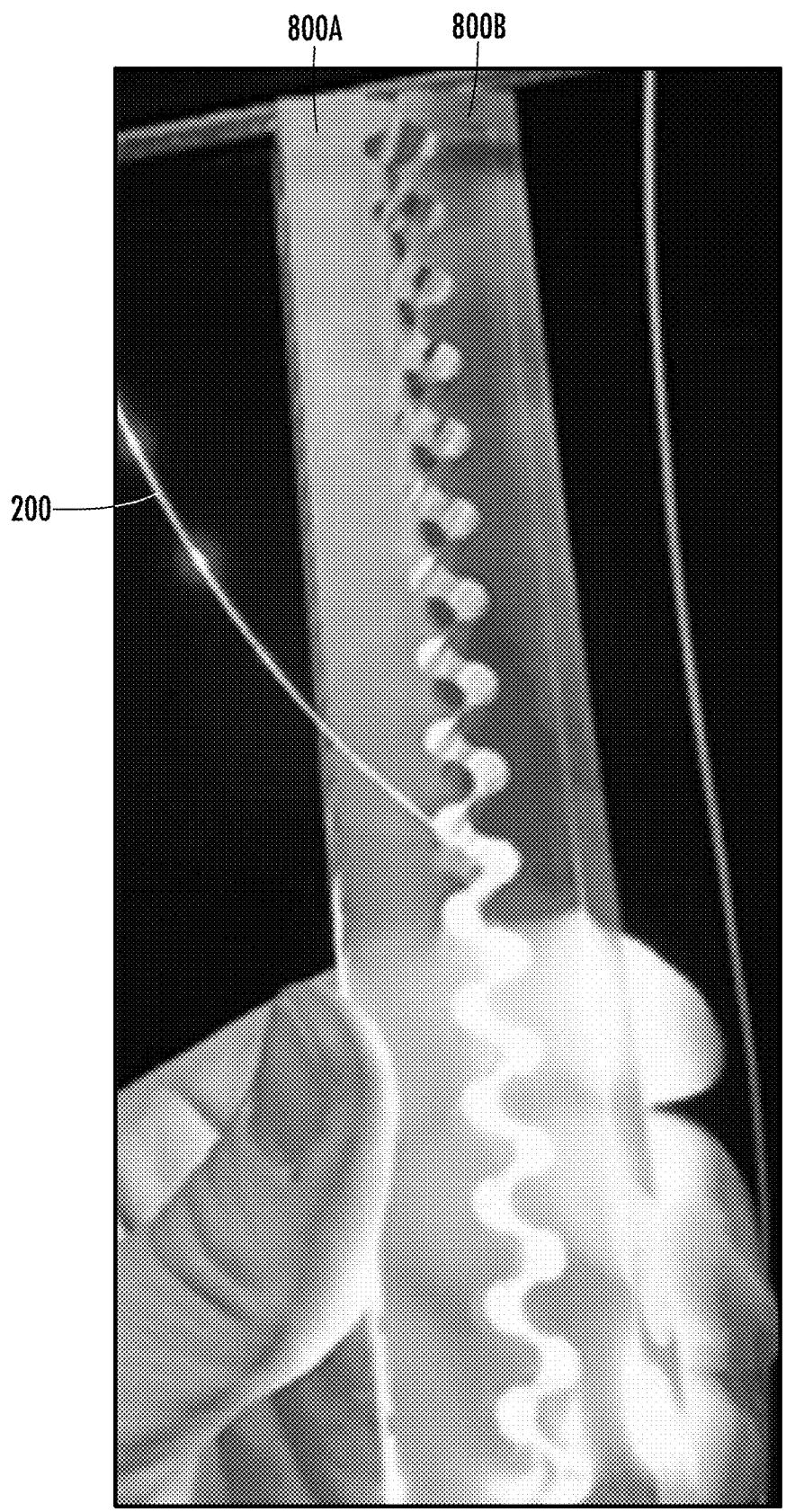
FIG. 8 is a perspective view of the BIS optical fiber of FIGS. 2A-4B illustrating performance with 658 nm light within a 2.5 mm radius bending apparatus.

FIG. 8 is a perspective view of the BIS optical fiber 200 of FIGS. 2A-4B illustrating performance with 658 nm light before and within a 2.5 mm radius bending apparatus. In particular, the BIS optical fiber 200 is pressed between teeth of gears 800A, 800B with controlled radii of curvature.

Figure 9A:
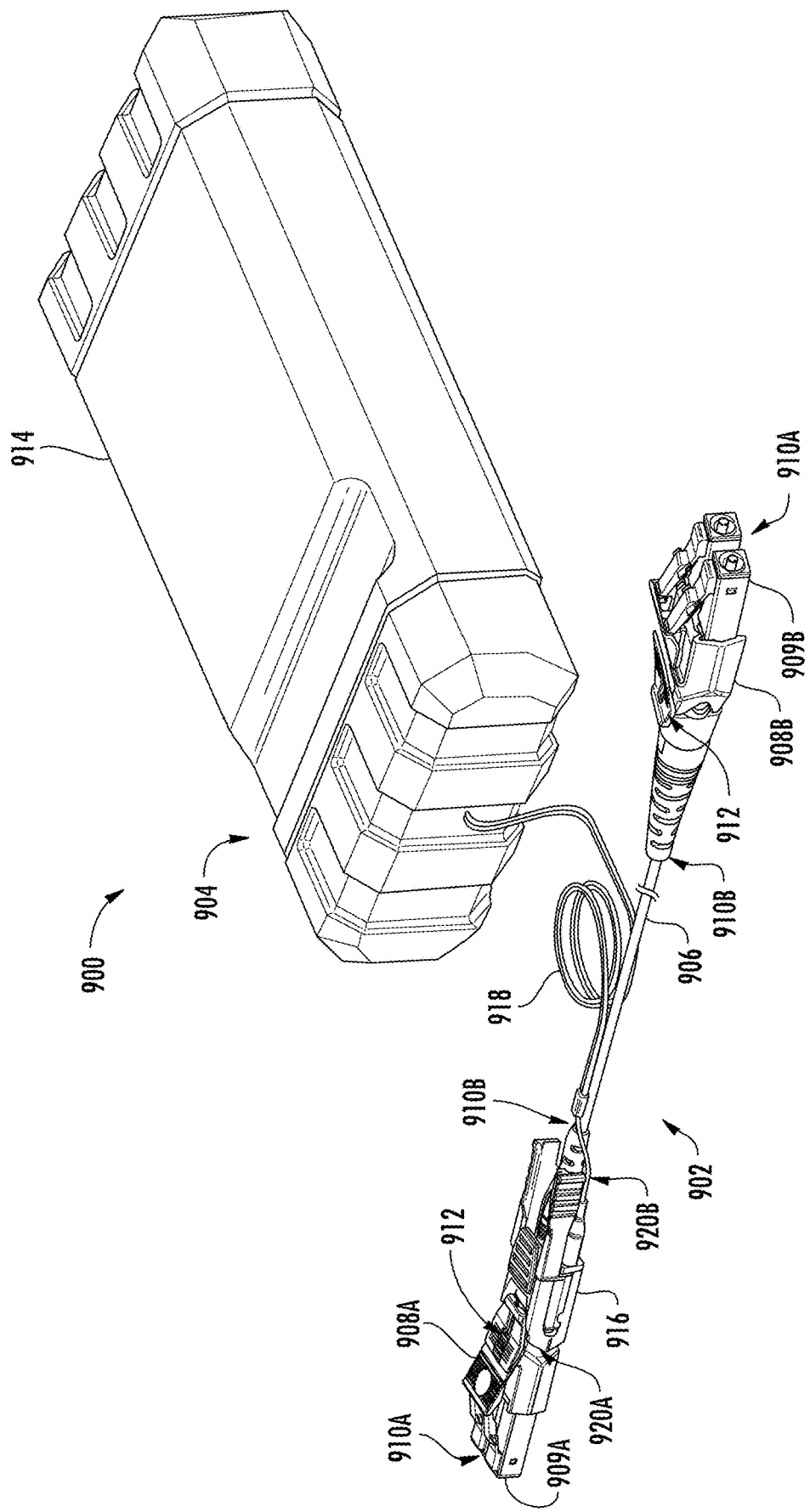
FIG. 9A is a perspective view of an exemplary cable and light injection system using the BIS optical fiber of FIGS. 2A-8.
Figure 9B:
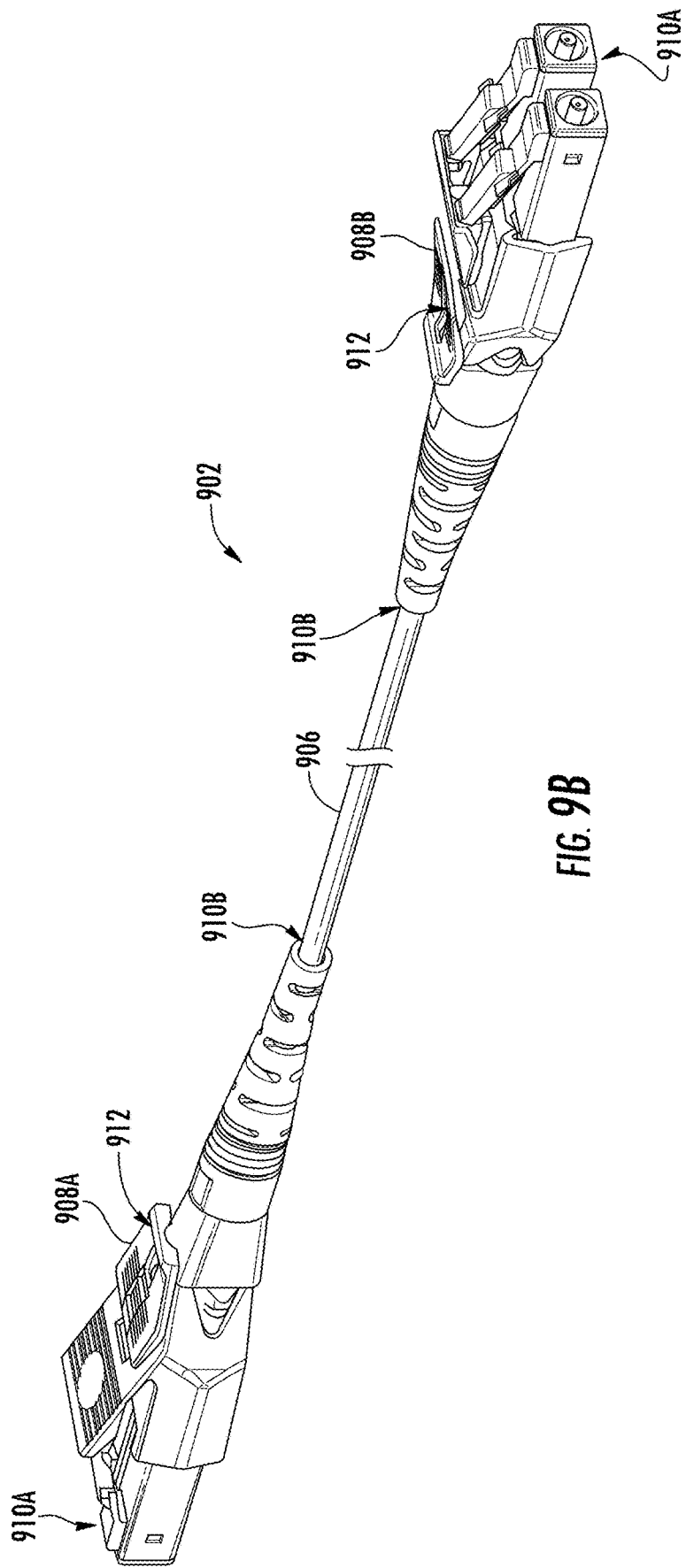
FIG. 9B is a perspective view of the fiber optic cable assembly of FIG. 9A.

FIGS. 9A-9B are views of an exemplary cable tracing system 900 using the BIS optical fiber of FIGS. 2A-8. In certain embodiments, a cable tracing system 900 facilitates the identification (or "tracing") of ends of a fiber optic cable 906 (e.g., traceable fiber optic cable) using fiber optic tracing signals. The cable tracing system 900 comprises a traceable fiber optic cable assembly 902 (may also be referred to as an optical communication cable assembly) and a light launch device 904. The cable tracing system 900 allows a user to selectively attach the light launch device 904 to a part of the traceable fiber optic cable assembly 902 and use the light launch device 904 to inject one or more optical tracing signals (e.g., fiber optic tracing signal, a first optical tracing signal, second optical tracing signal, etc.) into the traceable fiber optic cable assembly 902. This allows the user to trace the location of an endpoint of the traceable fiber optic cable assembly 902 based on the propagation of the optical tracing signals into the traceable fiber optic cable assembly 902.

The traceable fiber optic cable assembly 902 comprises a fiber optic cable 906, a first fiber optic connector 908A (e.g., traceable fiber optic cable first connector, traceable fiber optic cable assembly first connector, etc.) at a first end of the fiber optic cable 906, and a second fiber optic connector 908B (e.g., traceable fiber optic cable second connector, traceable fiber optic cable assembly second connector, etc.) at a second end of the fiber optic cable 906. The first fiber optic connector 908A and the second fiber optic connector 908B are present on opposite ends (e.g., first end 909A, and second end 909B) of the fiber optic cable 906 to allow the traceable fiber optic cable assembly 902 to act as a patch cord between components of a network. In use, the fiber optic cable 906 may extend between two locations, such as two equipment racks in a data center, telecommunications room, or the like. Further, in some embodiments, the fiber optic cable 906 may have a length between about 0 meters and about 30 meters, and in some embodiments, the fiber optic cable 906 may have a length between about 1 meter and about 5 meters. In other embodiments, the fiber optic cable 906 may have a length of more than 30 meters.

The first and second fiber optic connectors 908A, 908B are merely an example. Thus, although FIGS. 9A-9B (among other figures herein) illustrate the first and second fiber optic connectors 908A, 908B as an LC duplex connector, the features described below may be applicable to different connector configurations and different connector sub-assembly designs. This may include simplex configurations of LC connector sub-assemblies, and both simplex and duplex configurations of different (i.e., non-LC) connector sub-assembly designs.

The first fiber optic connector 908A and the second fiber optic connector 908B each comprise a distal end 910A and a proximal end 910B. More specifically, the proximal end 910B of the first fiber optic connector 908A and the second fiber optic connector 908B is towards a center of the fiber optic cable 906, in other words, the distance between the proximal ends 910B of the first and second fiber optic connectors 908A, 908B is less than the distance between the distal ends 910A of the first and second fiber optic connectors 908A, 908B, In one embodiment, the traceable fiber optic cable assembly 902 comprises an end point only (EPO) configuration. In an EPO configuration, a far end of the traceable fiber optic cable assembly 902 (e.g., second fiber optic connector 908B) illuminates (e.g., lights up) when a near end of the traceable fiber optic cable assembly 902 (e.g., a first fiber optic connector 908A) is activated (e.g., receives an optical tracing signal).

The light launch device 904 comprises a launch module 914, a launch connector 916, and a launch cable 918 therebetween. The launch module 914 generates the fiber optic tracing signal for direction through the traceable fiber optic cable assembly 902. The launch connector 916 is selectively attachable to and removable from the first fiber optic connector 908A and/or second fiber optic connector 908B. The launch cable 918 directs (e.g., propagates) the fiber optic tracing signal from the launch module 914 to the first fiber optic connector 908A or the second fiber optic connector 908B. In this way, one or more BIS optical fibers 200 (see FIGS. 2A-2B) within the launch cable 918 provide for injection of the fiber optic tracing signal into the fiber optic cable 906 for traceability of the fiber optic cable 906 from one or both the ends 909A, 909B of the fiber optic cable 906. The launch connector 916 comprises a distal end 920A and a proximal end 920B.

In certain embodiments, the fiber optic cable 906 is devoid of data transmission elements other than one or more BIS optical fibers 200, which are configured to transmit data between the first and second fiber optic connectors 908A, 908B.

Figure 10:
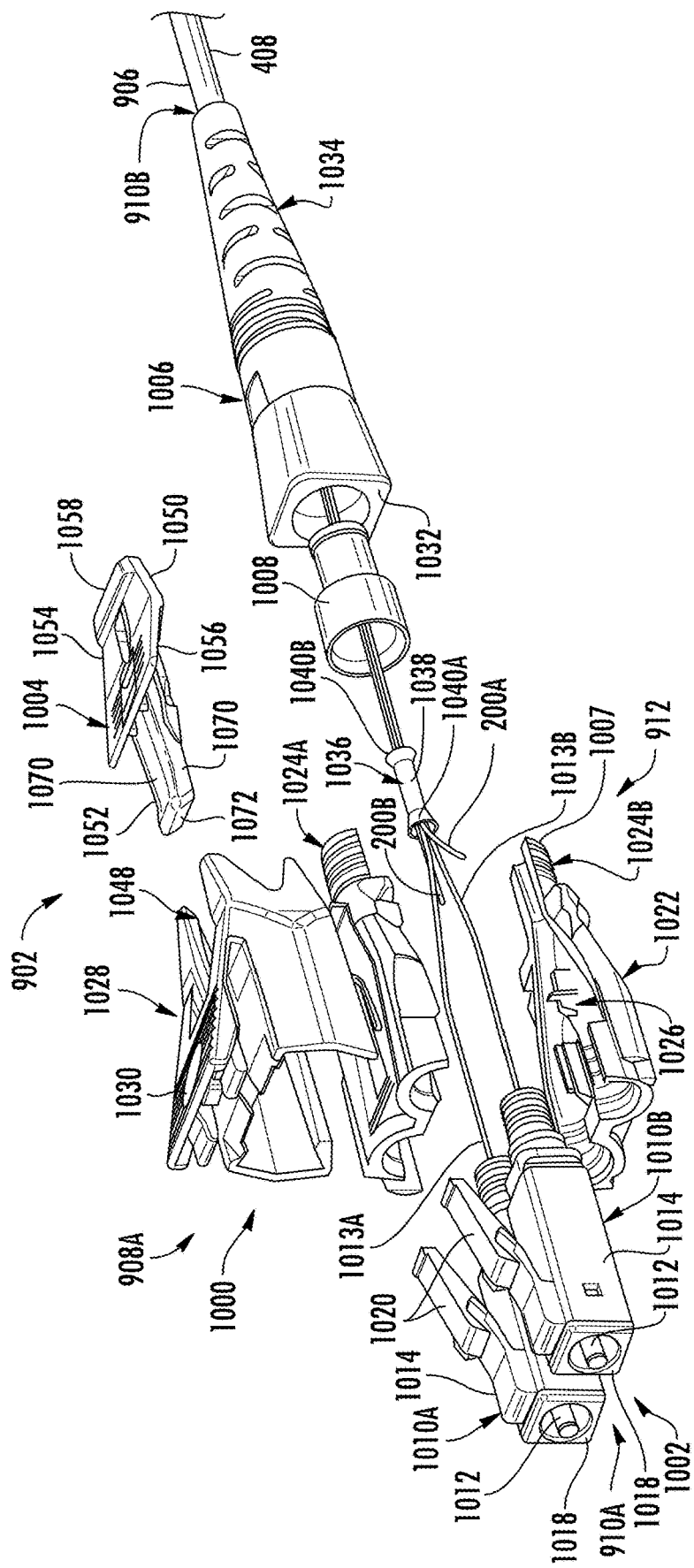
FIG. 10 is an exploded view of the first fiber optic connector of FIGS. 9A-9B.

FIG. 10 is a view of the first fiber optic connector of FIGS. 9A-9B. The first and second fiber optic connectors 908A, 908B (e.g., optical connector, connector, etc.) are in the form of an LC duplex connector (although other types of connectors could be used). Each of the first and second fiber optic connector 908A, 908B comprises a housing 1000, a connection interface 1002, a locking member 1004 (e.g., lock feature), a boot 1006, and a crimp band 1008, as explained below in more detail. It is noted that any discussion of these components with respect to the one of the first and second fiber optic connectors 908A, 908B applies to both of the first and second optic connectors 908A, 908B.

The connection interface 1002 comprises first and second LC connector sub-assemblies 1010A, 1010B, As shown, each connector sub-assembly 1010A, 1010B includes a ferrule 1012 configured to support an optical fiber (e.g., the first and second data transmission fibers 1013A, 1013B) and a ferrule casing 1014 (e.g., connector sub-assembly housing, housing, etc.) surrounding a portion of the ferrule 1012. The ferrule 1012 extends from a ferrule holder that is retained in the ferrule casing 1014 by a cap 1018 or internal geometry of the ferrule casing 1014. A spring (not shown) biases the ferrule holder forward within the ferrule casing 1014 so that a front end of the ferrule 1012 projects beyond the ferrule casing 1014. The front end presents the optical fiber (e.g., data transmission fiber 1013A, 1013B) for optical coupling with a mating component (e.g., another fiber optic connector).

Each connector sub-assembly 1010 also includes a latch arm 1020 extending outwardly and rearwardly from a portion of the ferrule casing 1014. Thus, the latch arm 1020 has a proximal end coupled to the ferrule casing 1014 and a distal end spaced from the ferrule casing 1014. The distal end of the latch arm 1020 may be depressed toward the ferrule casing 1014 for mating purposes.

The housing 1000 of the first fiber optic connector 908A includes a body 1022 in Which a rear portion of each connector sub-assembly 1010 (e.g., rear portions of ferrule casing 1014) is received. The body 1022 comprises a top clamshell 1024A and a bottom clamshell 1024B (e.g., a two-piece construction). In some embodiments, at least a portion of the first connector is translucent and at least a portion of the second connector is translucent. As such, in some embodiments at least a portion of the body 1022 is translucent to allow at least a portion of the optical tracing signal to exit the housing 1000. In this particular embodiment, the entirety of the body 1022 is translucent. Note that translucent, at least as used herein, comprises semi-transparent and transparent. In particular, as used herein, the term semi-transparent identifies objects that allow at least some light to pass through at least part of the object and transparent identifies objects that allow substantially all light to pass through all or part of the object. In some embodiments, at least part of the body 1022 is semi-transparent (e.g., translucent but not transparent). In yet other embodiments, at least part of the body 1022 is transparent. Top and bottom clamshells 1024A, 1024B attach together to define an interior 1026 (e.g., of the housing 1000). The first and second data transmission elements embodied as data transmission fibers 1013A, 1013B (e.g., first and second optical data fibers) are routed through the interior 1026 from the rear of the housing 1000 to the connector sub-assemblies 1010. The top and bottom surface of the body 1022 is mostly flat as this is where the light exits the body 1022, and it is desirable to leave the light path uninterrupted until it reaches the locking member 1004 (described below in more detail).

The housing 1000 further comprises a trigger casing 1028 with a trigger arm 1030 extending forward and outwardly from a top of the trigger casing 1028 (and/or body 1022). The trigger arm 1030 is depressible and biased upward (e.g., away from the body 1022). The trigger arm 1030 extends outwardly from the body 1022 and over the distal end of the latch arm 1020. This advantageously allows the trigger arm 1030 to engage and disengage both latch arms 1020 at the same time with a single trigger, and also inhibits fiber optic cables from snagging on the latch arms 1020. The locking member 1004 moves relative to the housing 1000 (including the trigger casing 1028 and trigger arm 1030) to allow or prevent the trigger arm 1030 from depressing and activating the latch arms 1020. The trigger casing 1028 is sliclably removable from the body 1022, such as to reverse polarity of the first fiber optic connector 908A (explained in more detail below).

The trigger arm 1030 is shown as a separate component (e.g., a clip) removably attached to the body 1022, but may alternatively be integrally formed with the body 1022 so as to be part of a unitary (i.e., monolithic) structure with the body 1022. However, providing the trigger arm 1030 as a removable component may provide certain benefits. For example, it may be possible to remove the trigger arm 1030 and attach it to the opposite side of the body 1022. The connector sub-assemblies 1010 may also be configured to independently rotate within the body 1022 so the latch arms 1020 can be orientated on the opposite side of the body 1022 as well. Repositioning the trigger arm 1030 and connector sub-assemblies 1010 in such a manner reverses the polarity scheme of the first fiber optic connector 908A. Additional details and advantages of such polarity reversal, and an exemplary configuration of the trigger arm 1030 and body 1022 in general, are described in U.S. Patent No. 8,152,385, whose disclosure of these aspects is herein incorporated by reference.

As similarly discussed in FIG. 4, the fiber optic cable 906 includes a jacket 408 (see FIGS. 4A-4B). The housing 1000 may be attached to a fiber optic cable 906 that includes the first and second data transmission fibers 1013A, 1013B (e.g., first and second optical data fibers and first and second BIS optical fibers 200A, 200B). For example, the BIS optical fibers 200 (see FIGS. 2A-2B) may be un-buffered fibers extending from within a jacket 408 of the fiber optic cable 906. One or more strength members (e.g., aramid yarn) may extend from the jacket 408. The strength members may be secured to a rear 1007 of the housing 1000 by a crimp band 1008 that is crimped onto the rear of the housing 1000. In other embodiments, the fiber optic cable 906 may have a different configuration or be secured to the housing 1000 or other part of the first fiber optic connector 908A in a different manner (e.g., using an adhesive)

To help prevent sharp bends in the optical fibers where the fiber optic cable 906 is secured to the housing 1000, the first fiber optic connector 908A further includes a boot 1006 extending over a portion of the fiber optic cable 906 and the housing 1000. The boot 1006 comprises a substantially flat proximal surface 1032 (e.g., with a substantially rectangular cross section). Slots 1034 provide controlled bending for fiber optic cable 906. Boot 1006 is rotatably attached to the housing 1000. More specifically, boot 1006 is able to be rotated at least about 45 degrees in both directions, thereby allowing removal of the trigger arm 1030 for polarity reversal (explained in more detail below).

Further, the housing 1000 may further comprise a metal guide tube 1036 at a rear of the housing 1000 to further prevent sharp bends in the optical fibers as the optical fibers enter the body 1022. More specifically, the metal guide tube 1036 comprises a cylindrical body 1038 with a first tapered end 1040A and a second tapered end 1040B opposite thereto. The first and second tapered ends 1040A, 1040B further prevent sharp bends. The metal guide tube 1036 prevents the optical fibers from being pinched during assembly of the top clamshell 1024A to the bottom clamshell 1024B.

Figure 11:
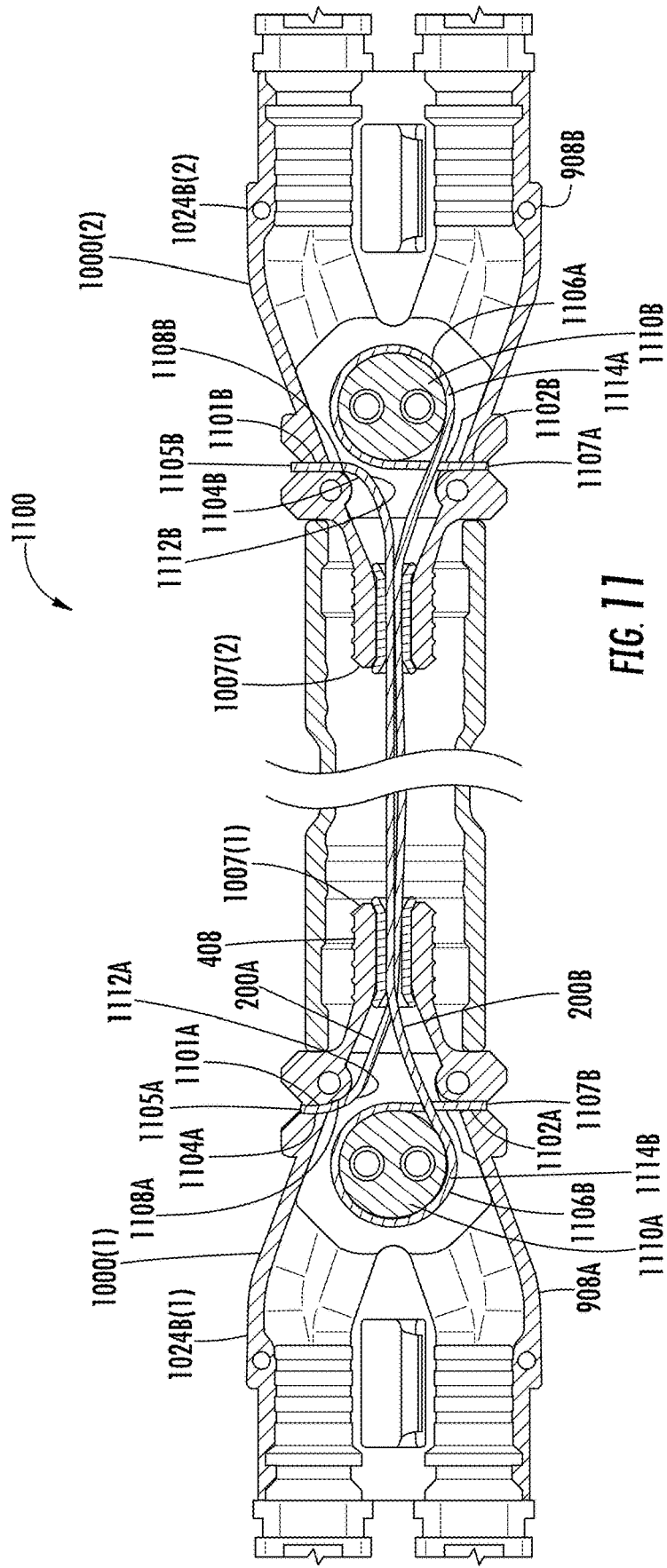
FIG. 11 is a top view of bottom clamshells of the fiber optic connectors of FIGS. 9A-10 with BIS optical fibers as tracing fibers.

FIG. 11 is a top view of bottom clamshells 1024B of the fiber optic connectors 908A, 908B of FIGS. 9A-10 of a fiber optic cable assembly with BIS optical fibers 200A, 200B as tracing fibers.

Although top and bottom clamshells 1024A, 1024B (see FIG. 10) are identical, as discussed above, in other embodiments top and bottom clamshells 1024A, 1024B may not be substantially identical, such as one half may comprise all the alignment cavity features and the other half comprise all the alignment protrusion features. Likewise, other configurations are possible for securing the housing components together. Other variations include a housing formed from a single component that has an upper and lower portion connected by a living hinge.

The BIS optical fibers 200A, 200B extend between the first and second fiber optic connectors 908A, 908B of the of a fiber optic cable assembly 1100.

In certain embodiments, the fiber optic cable 906 includes a first BIS optical fiber 200A, and a second optical fiber 200B positioned within the jacket 408 (data transmission fibers 1013A, 1013B (see FIG. 10) are omitted). The first bottom clamshell 1024B(1) (and/or first top clamshell 1024A (see FIG. 10)) includes a first entry channel 1101A and a first emission channel 1102A, and the second bottom clamshell 1024B(2) (and/or second top clamshell 1024A (see FIG. 10)) includes a second entry channel 1101B and a second emission channel 1102B (may be referred to generally as an entry channel 1101 and an emission channel 1102). Accordingly, a first end portion 1104A (including a first end 1105A) of a first BIS optical fiber 200A is positioned proximate (e.g., in or near) the first fiber optic connector 908A. In particular, the first end portion 1104A of the first BIS optical fiber 200A is positioned in the first entry channel 1101A in the first fiber optic connector 908A. A second end portion 1106A (including a second end 1107A) of the first BIS optical fiber 200A is positioned proximate (e.g., in or near) the second fiber optic connector 908B.

In some embodiments, the first connector includes an entry channel 1101A to maintain the first end portion 1104A of the BIS optical fiber 200A above the critical radius of curvature and the second connector 908B includes an emission channel 1.102E to maintain the second end portion 1106B of the BIS optical fiber 200A below the critical radius of curvature. In some embodiments, the emission channel 1102B provides about a 270 degree bend for the second end portion 1106B of the BIS optical fiber 200A.

In particular, the second end portion 1106B of the first BIS optical fiber 200A is positioned in the second emission channel 1102B in the second fiber optic connector 908B. Similarly, a first end portion 1104B (including a first end 1105B) of the second BIS optical fiber 200B is positioned proximate (e.g., in or near) the second fiber optic connector 908B. In particular, the first end portion 1104B is positioned in the second entry channel 1101B in the second fiber optic connector 908B. A second end portion 1106B (including a second end 1107B) of the second BIS optical fiber 200B is positioned proximate (e.g., in or near) the first fiber optic connector 908A. In particular, the second end portion 1106B is positioned in the first emission channel 1102A in the first fiber optic connector 908A.

The first bottom clamshell 1024A(1) includes a first protrusion 1108A positioned proximate the first entry channel 1101A, between the first entry channel 1101A and the rear 1007(1) of the housing 1000(1). The first protrusion 1108A protrudes inwardly and has a radius of curvature above the critical radius of curvature. The first bottom clamshell 1024(1) includes a first central hub 1110A defining a circular shape and having a radius of curvature below the critical radius of curvature.

Similarly, the second bottom clamshell 1024A(2) includes a second protrusion 1108B positioned proximate the second entry channel 1101B, between the second entry channel 1101B and the rear 1007(2) of the housing 1000(2). The second protrusion 1108B protrudes inwardly and has a radius of curvature above the critical radius of curvature. The second bottom clamshell 1024(2) includes a second hub 1110E defining a circular shape and having a radius of curvature below the critical radius of curvature.

The entry channels 1101 and the protrusions 1108 maintain a first radius of curvature of first and second entry bends 1112A, 1112B of first and second BIS optical fibers 200A, 200B above the critical radius of curvature for light entry into the BIS optical fibers 200A, 200B. The emission channels 1102 and central hubs 1110 maintain a second radius of curvature of first and second emission bends 1110A, 1110B of the first and second BIS optical fibers 200A, 200B below the critical radius of curvature for light emission out of the BIS optical fibers 200A, 200B. In other words, the entry channels 1101 and protrusions 1108 maintain (i.e., prevent from exceeding) the BIS optical fiber 200 above the critical radius of curvature for light emission thereby allowing entry of tracer light, and the emission channels 1102 maintain (i.e., prevent from exceeding) the BIS optical fiber 200 below the critical radius of curvature for light emission (but above the radius of curvature for damaging the BIS optical fiber 200) thereby emitting tracer light within the fiber optic connectors 908A, 908B. At least part of the fiber optic connector 908A, 908B is transparent, thereby allowing for end point only tracing applications, where light is emitted at the bends within the optical connectors, while also allowing for identification of bends and kinks in the cable.

In particular, in certain embodiments, the first fiber optic connector 908A includes a first entry channel 1101A and a first protrusion 1108A to maintain a first entry bend 1112A of a first end portion 1104A of the first BIS optical fiber 200A above a critical radius of curvature for light emission, and the first fiber optic connector 908A includes a first emission channel 1102A and central hub 1110A to maintain a second emission bend 1110B of a second end portion 1104B of the second optical fiber 200B below a critical radius of curvature for light emission. The second connector 908B includes a second entry channel 1101B and second protrusion 1108B to maintain a second entry bend 1108B of a second end portion 1104B of the second optical fiber 200B above a critical radius of curvature for light emission, and the second connector 908B includes a second emission channel 1102B and a second central hub 1110B to maintain a first emission bend 1110A of a second end portion 1106A of the first BIS optical fiber 200A below a critical radius of curvature for light emission.

The first and second entry channels 1101A, 1101B and first and second protrusions 1108A, 1108B provide a bend of about 90 degrees. The first and second emission channels 1102A, 1102B and first and second central hubs 1110A, 1110B provide a looped bend of about 270 degrees. As a result, the BIS optical fiber 200 may be looped one or more times around the central hubs 1110A, 1110B. In other words, in certain embodiments, a first BIS optical fiber 200 includes a first entry bend 1112A in the first connector 908A and a first emission bend 1114A in the second connector 908B, where the first emission bend 1114A is less than the critical radius of curvature. In certain embodiments, the first entry bend 1112A is equal to or greater than about 90 degrees. In certain embodiments, the first entry bend 1112A is equal to or greater than about 180 degrees. In certain embodiments, the first entry bend 1112A is equal to or greater than about 270 degrees. In certain embodiments, the first emission bend 1114A is equal to or greater than about 90 degrees. In certain embodiments, the first emission bend 1114A is equal to or greater than about 180 degrees. In certain embodiments, the first emission bend 1114A is equal to or greater than about 270 degrees. Other bends could be used for the entry channel 1101 and/or the emission channel 1102.

In this way, the BIS optical fiber 200 serves as an End Point Only (EPO) traceable fiber, and can also identify bends and kinks in the cable, as discussed above.

By using a BIS optical fiber 200 instead of a non-scattering fiber, light at the far end of fiber optic connector 908A, 908B does not need to be redirected as it exits the side of the connector. Instead, the BIS optical fiber 200 will light up the connector uniformly, enhancing visibility. For example, a non-scattering fiber may lose light in a 90 degree bend and may not scatter evenly in all directions, which could substantially reduce the glow and visibility of the connector. In certain embodiments, the BIS optical fiber 200 is configured to have a different lower NA from other fibers in the cable tracing system 900 to increase the amount of light emitted and scattered. In certain embodiments, there is an optimal fraction of light that should be scattered, as higher or lower scattering fractions may reduce the overall visibility of the far end fiber optic connector 908A, 908B.

Figure 12:
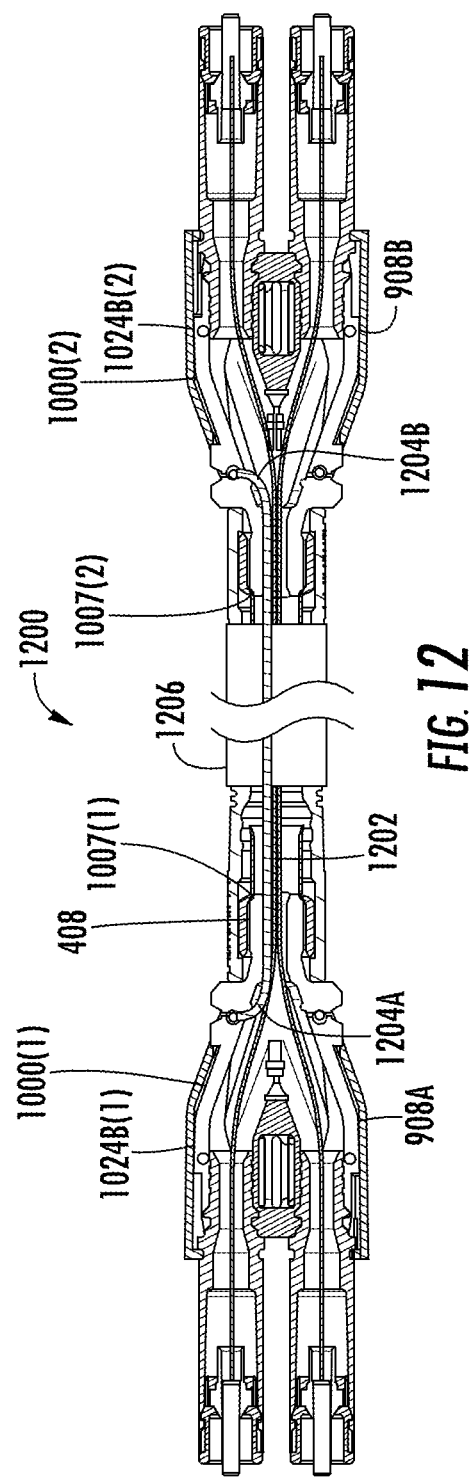
FIG. 12 is a top view of bottom clamshells of the fiber optic connectors of FIGS. 9A-10 with a single BIS optical fiber as a tracing fiber.

FIG. 12 is a top view of bottom clamshells of the fiber optic connectors of FIGS. 9A-10 with a single BIS optical fibers as a tracing fiber. The fiber optic cable assembly 1200 of FIG. 12 includes the same features as the fiber optic cable assembly 1100 of FIG. 11, except where otherwise noted.

It is noted that in certain embodiments, a tracing optical fiber 1202 is a BIS optical fiber, such that the first tracing optical fiber 1202 emits light at a first bend 1204A within the first fiber optic connector 908A, and the first tracing optical fiber 1202 emits light at a second bend 1204B within the second fiber optic connector 908B. In this way, the first tracing optical fiber 1202, first bend 1204A, and/or second bend 1204B are configured to emit light at an opposite end of a traceable fiber optic cable 1206. In particular, for example, if a first optical tracing signal is inserted into the first fiber optic connector 908A, some light is emitted at the first bend 1204A at the first fiber optic connector 908A and then light is emitted again at the second bend 1204B at the second fiber optic connector 908B. However, the first tracing optical fiber 1202, first bend 1204A, and/or second bend 1204B are specifically configured to emit some light for visual detection of a far end of the traceable fiber optic cable 1206 regardless of which end the light is injected, but is also configured not to emit too much light that too little light emits from the far end of the traceable fiber optic cable 1206. For example, in certain embodiments, the first bend 1204A and the second bend 1204B are configured to emit 0.2 to 0.3 dB (e.g., with 30 mW being injected at the first fiber optic connector 908A). This way, regardless of which end of the traceable fiber optic cable 1206 the first optical tracing signal is injected, a sufficient amount of light is emitted at the far end for easy and effective visual detection by a user.

Figure 13:
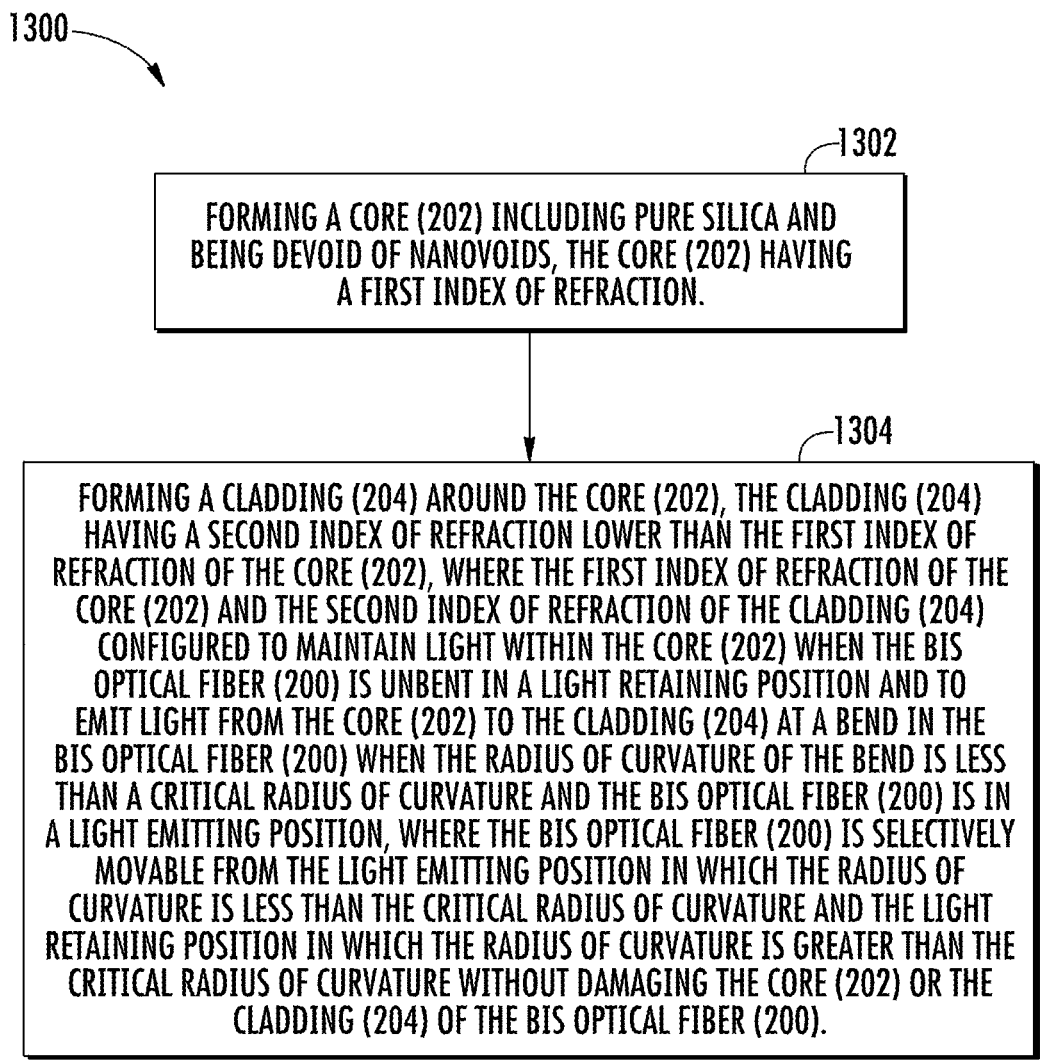
FIG. 13 is a flowchart of steps for manufacturing the BIS optical fiber of FIGS. 2A-4.

FIG. 13 is a flowchart 1300 of steps for manufacturing the BIS optical fiber of FIGS. 2A-4B. In step 1302, a core 202 (see FIGS. 2A-2B) is formed, the core 202 including pure silica and being devoid of nanovoids, where the core 202 has a first index of refraction. In step 1304, a cladding 204 (see FIGS. 2A-2B) is formed and positioned around the core 202, where the cladding 204 has a second index of refraction lower than the first index of refraction of the core 202. The first index of refraction of the core 202 and the second index of refraction of the cladding 204 are configured to maintain light within the core 202 when the BIS optical fiber 200 is unbent in a light retaining position and to emit light from the core 202 to the cladding 204 at a bend in the BIS optical fiber 200 when the radius of curvature of the bend is less than a critical radius of curvature and the BIS optical fiber 200 is in a light emitting position. The BIS optical fiber 200 is selectively movable from the light emitting position in which the radius of curvature is less than the critical radius of curvature and the light retaining position in which the radius of curvature is greater than the critical radius of curvature without damaging the core 202 or the cladding 204 of the BIS optical fiber 200.

Optical data transmission fibers contemplated herein may comprise a single fiber, paired fibers, a plurality of optical fibers configured as an optical fiber ribbon, concentric bundles of optical fibers, or any other conventional or yet-to-be developed optical fiber configuration. For example, it is contemplated that the optical data transmission fibers may comprise concentric bundles of optical fibers. It is contemplated that optical tracer fibers disclosed herein may assume any location within an optical fiber cable assembly, regardless of where it lies in the cross section of the assembly. In many embodiments, care should be taken to ensure that the cabling media, which may include strength members, buffer tubes, etc., permits propagation of the tracer wavelength or wavelength range $\lambda_T$ or an optically visible shifted tracer wavelength or wavelength range $\lambda_T^*$ from the optical tracer fiber to the cable jacket.

It is noted that optical fiber cabling media may take a variety of conventional and yet-to-be developed forms. For example, where an optical fiber cable assembly comprises an optical waveguide disposed within a protective tube, the optical waveguide must be further protected within the tube and a certain amount of relative movement between the optical waveguide and the tube should be permitted. To this end, it is not unusual to provide water blocking tapes, yarns, woven binder threads, dry inserts, thixotropic greases, strength members, buffer tubes, fiber coatings, etc., as cabling media in the space between the optical fibers of the cable and the cable jacket, and in the space between the optical fibers themselves. These types of materials are referred to herein collectively as cabling media. For example, un-armored and armored cable assemblies that comprise concentric bundles of tight-buffered fibers within a polymer or flame retardant polymer jacket are contemplated by the present disclosure. Cable assemblies contemplated herein may further comprise a flexible, helically wrapped or corrugated, aluminum or steel interlocking armor surrounded by a polymer or flame-retardant polymer outer jacket. Of course, it is contemplated that the concepts of the present disclosure will enjoy applicability to a wide variety of optical fiber cable configurations and should not be limited to the particular embodiments disclosed herein.

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An optical communication cable assembly including a bend-induced light scattering (BIS) optical fiber, comprising:
    a cable comprising at least one data transmission fiber, a bend-induced light scattering (BIS) optical fiber, and a jacket;
    a first connector at a first end of the jacket; and
    a second connector at a second end of the jacket, wherein the BIS optical fiber comprising an entry bend positioned in the first connector and an emission bend positioned in the second connector;
    the BIS optical fiber further comprising:
        a core comprising pure silica and being devoid of nanovoids, the core having a first index of refraction; and
        a cladding surrounding the core, the cladding having a second index of refraction that is lower than the first index of refraction of the core;
        wherein the first index of refraction of the core and the second index of refraction of the cladding are configured to maintain light within the core when the BIS optical fiber is unbent in a light retaining position and to emit light from the core to the cladding at a bend in the BIS optical fiber when a radius of curvature of the bend is less than a critical radius of curvature and the BIS optical fiber is in a light emitting position; and
        wherein the BIS optical fiber is selectively movable from the light emitting position in which the radius of curvature is less than the critical radius of curvature and the light retaining position in which the radius of curvature is greater than the critical radius of curvature without damaging the core or the cladding of the BIS optical fiber.

2. The optical communication cable assembly of claim 1, wherein the emission bend is less than the critical radius of curvature.

3. The optical communication cable assembly of claim 2, wherein the emission bend is equal to or greater than about 90 degrees.

4. The optical communication cable assembly of claim 2, wherein the emission bend is equal to or greater than about 180 degrees.

5. The optical communication cable assembly of claim 2, wherein the entry bend is greater than the critical radius of curvature.

6. The optical communication cable assembly of claim 1, wherein the first connector comprises an entry channel to maintain the entry bend of the BIS optical fiber above the critical radius of curvature.

7. The optical communication cable assembly of claim 6, wherein the second connector comprises an emission channel to maintain the emission bend of the BIS optical fiber below the critical radius of curvature.

8. The optical communication cable assembly of claim 7, wherein the emission channel provides about a 270 degree bend.

9. The optical communication cable assembly of claim 1, wherein at least a portion of the first connector is translucent and at least a portion of the second connector is translucent.

10. A method of manufacturing an optical communication cable assembly having a bend-induced light scattering (BIS) optical fiber, comprising:
    forming a cable comprising a jacket, at least one data transmission fiber, and a bend-induced light scattering (BIS) optical fiber, wherein the BIS optical fiber comprises a core comprising pure silica and being devoid of nanovoids and a cladding around the core, the core having a first index of refraction and the cladding having a second index of refraction that is lower than the first index of refraction of the core, the first index of refraction of the core and the second index of refraction of the cladding configured to maintain light within the core when the BIS optical fiber is unbent in a light retaining position and to emit light from the core to the cladding at a bend in the BIS optical fiber when a radius of curvature of the bend is less than a critical radius of curvature and the BIS optical fiber is in a light emitting position;

securing a first connector at a first end of the cable;

securing a second connector at a second end of the cable; and creating an entry bend in the BIS optical fiber and positioning the entry bend in the first connector; and creating an emission bend and positing the emission bend in the second connector, wherein the emission bend is less than the critical radius of curvature.

11. The method of claim 10, wherein the emission bend is equal to or greater than about 90 degrees.

12. The method of claim 10, wherein the emission bend is equal to or greater than about 180 degrees.

13. The method of claim 10, wherein the entry bend is greater than the critical radius of curvature.

14. The method of claim 10, wherein the first connector comprises an entry channel to maintain the entry bend greater than the critical radius of curvature.

15. The method of claim 10, wherein the second connector comprises an emission channel to maintain the emission bend less than the critical radius of curvature.

16. The method of claim 15, wherein the emission channel provides about a 270 degree bend.

17. A bend-induced light scattering (BIS) optical fiber, comprising:

a core comprising pure silica and being devoid of nanovoids, the core having a first index of refraction; and a cladding surrounding the core, the cladding having a second index of refraction that is lower than the first index of refraction;

wherein the first index of refraction of the core and the second index of refraction of the cladding are configured to maintain light within the core when the BIS optical fiber is unbent in a light retaining position and to emit light from the core to the cladding at a bend in the BIS optical fiber when a radius of curvature of the bend is less than a critical radius of curvature and the BIS optical fiber is in a light emitting position; and wherein the BIS optical fiber is selectively movable from the light emitting position in which the radius of curvature is less than the critical radius of curvature and the light retaining position in which the radius of curvature is greater than the critical radius of curvature without damaging the core or the cladding of the BIS optical fiber;

wherein the core comprises a diameter between about 80 µm and about 250 µm and the cladding comprises a diameter between about 100 µm and about 350 µm.

18. The BIS optical fiber of claim 17, wherein the light emitted from the core to the cladding is between about 0.2 dB and about 2 dB over 1 mm to 75 mm of fiber length at the bend when the radius of curvature is between about 2 mm to about 3.5 mm.

19. The BIS optical fiber of claim 18, wherein the core comprises a high purity fused silica core with about a 125 µm diameter and the first index of refraction between 1.46 and 1.47 measured at 532 nm;

wherein the cladding comprises a diameter between about 155 µm and about 160 µm and the second index of refraction of about 1.38 measured at 589 nm;

wherein the critical radius of curvature is between about 1.9 mm and 3 mm.

20. The BIS optical fiber of claim 17, wherein the cladding comprises a first fluorinated acrylate cladding layer with a diameter between about 100 µm and about 170 µm and a second acrylate cladding layer with a diameter between about 140 µm and about 250 µm.

21. The BIS optical fiber of claim 17, wherein the cladding comprises a light scattering mechanism.

22. The BIS optical fiber of claim 21, wherein the light scattering mechanism comprises light scattering ink.

* * * * *

UNITED STATES PATENT AND TRADEMARK OFFICE
CERTIFICATE OF CORRECTION

PATENT NO. : 10,539,747 B2
APPLICATION NO. : 16/144094
DATED : January 21, 2020
INVENTOR(S) : Adam Kent Collier Page 1 of 2

It is certified that error appears in the above-identified patent and that said Letters Patent is hereby corrected as shown below:

On the Title Page

On page 2, Column 2, item (56), U.S. patent documents, Line 50, delete "Birilduze" and insert -- Birilbuze --, therefor On page 4, Column 2, item (56), other publications, Line 3, delete "Characterizaion" and insert -- Characterization --, therefor.

On page 4, Column 2, item (56), other publications, Line 3, delete "Emmitting" and insert -- Emitting --, therefor.

On page 4, Column 2, item (56), other publications, Line 4, delete "Jounal" and insert -- Journal --, therefor.

On page 4, Column 2, item (56), other publications, Line 16, delete "Galvonameters," and insert -- Galvanometers, --, therefor.

On page 4, Column 2, item (56), other publications, Line 17, delete "Acessories," and insert -- Accessories, --, therefor.

On page 4, Column 2, item (56), other publications, Line 17, delete "rneshtel" and insert -- meshtel --, therefor.

On page 4, Column 2, item (56), other publications, Line 18, delete "oage." and insert -- page. --, therefor.

On page 4, Column 2, item (56), other publications, Line 19, delete "ofTi02" and insert -- of TiO2 --, therefor.

Signed and Sealed this
Twenty-fourth Day of March, 2020

Andrei Iancu
*Director of the United States Patent and Trademark Office*

On page 4, Column 2, item (56), other publications, Line 25, delete "experiements" and insert -- experiments --, therefor.

In the Claims

In Column 23, Line 9, Claim 10, delete "positing" and insert -- positioning --, therefor.